(12) United States Patent
Pridmore, Jr. et al.

(10) Patent No.: US 7,102,478 B2
(45) Date of Patent: Sep. 5, 2006

(54) POWER LINE COUPLING DEVICE AND METHOD OF USING THE SAME

(75) Inventors: Charles Franklin Pridmore, Jr., Centreville, MD (US); Joseph C. Roesch, Herndon, VA (US); James D. Mollenkopf, Fairfax, VA (US); Brett Gidge, Germantown, MD (US); Steven R. Baker, Terre Haute, IN (US)

(73) Assignee: Current Technologies, LLC, Germantown, MD (US)

( * ) Notice: Subject to any disclaimer, the term of this patent is extended or adjusted under 35 U.S.C. 154(b) by 236 days.

(21) Appl. No.: 10/176,500

(22) Filed: Jun. 21, 2002

(65) Prior Publication Data

US 2003/0234713 A1 Dec. 25, 2003

(51) Int. Cl.
  *H01F 17/06* (2006.01)
(52) U.S. Cl. .................................. 336/176; 336/175
(58) Field of Classification Search ............. 336/175, 336/176, 174
  See application file for complete search history.

(56) References Cited

U.S. PATENT DOCUMENTS

| 1,547,242 | A | 7/1925 | Strieby |
| 2,298,435 | A | 10/1942 | Tunick ........................ 250/15 |
| 2,577,731 | A | 12/1951 | Berger ........................ 179/2.5 |
| 3,445,814 | A | 5/1969 | Spalti .......................... 340/151 |
| 3,605,009 | A | 9/1971 | Enge ............................. 323/93 |
| 3,641,536 | A | 2/1972 | Prosprich ................ 340/870.15 |
| 3,656,112 | A | 4/1972 | Paull ............................ 340/151 |
| 3,696,383 | A | 10/1972 | Oishi et al. .................. 340/310 |
| 3,701,057 | A | 10/1972 | Hoer ............................ 333/112 |
| 3,702,460 | A | 11/1972 | Blose .......................... 340/150 |
| 3,810,096 | A | 5/1974 | Kabat et al. ............. 340/147 R |
| 3,846,638 | A | 11/1974 | Wetherell ....................... 307/3 |
| 3,895,370 | A | 7/1975 | Valentini ..................... 340/310 |
| 3,900,842 | A | 8/1975 | Calabro et al ......... 340/310.03 |
| 3,911,415 | A | 10/1975 | Whyte ......................... 340/310 |
| 3,942,168 | A | 3/1976 | Whyte .................... 340/310.01 |
| 3,942,170 | A | 3/1976 | Whyte ......................... 340/310 |
| 3,962,547 | A | 6/1976 | Pattantyus-Abraham . 179/2.5 R |
| 3,964,048 | A | 6/1976 | Lusk et al. ............. 340/310 R |
| 3,967,264 | A | 6/1976 | Whyte et al. .......... 340/310.08 |
| 3,973,087 | A | 8/1976 | Fong ....................... 179/170 R |
| 3,973,240 | A | 8/1976 | Fong .......................... 340/151 |
| 3,993,110 | A | 11/1976 | Gustafsson .............. 179/170 J |

(Continued)

FOREIGN PATENT DOCUMENTS

DE 197 28 270 A1 1/1999

(Continued)

OTHER PUBLICATIONS

LONWORKS Engineering Bulletin, "Demand Side Management with LONWORKS® Power Line Transceivers," Dec. 1996, 36 pages.

(Continued)

*Primary Examiner*—Anh Mai
(74) *Attorney, Agent, or Firm*—Melvin L. Barnes, Jr.; Manelli Denison & Selter PLLC

(57) ABSTRACT

The coupling device of the present invention includes a housing, a first fastening member attached to said housing and coupled to the power line, a second fastening member attached to the housing and coupled to the power line, an inductor providing an impedance to data transmissions between the first fastening member and the second fastening member; a first conductor having a first end electrically coupled to the first fastening member; and a second conductor having a first end electrically coupled to the second fastening member. The second ends of the first conductor and second conductor providing data signals to a connector. In addition, the housing may include a transformer secured therein for coupling power transmissions to the connector.

42 Claims, 13 Drawing Sheets

U.S. PATENT DOCUMENTS

| | | | |
|---|---|---|---|
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Kilian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,323,882 A | 4/1982 | Gajjar | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310 R |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/57 Q |
| 4,413,250 A | 11/1983 | Porter et al. | 340/310.01 |
| 4,419,621 A | 12/1983 | Becker et al. | 324/51 |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/4 |
| 4,479,033 A | 10/1984 | Brown et al. | 179/2.51 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310 R |
| 4,569,045 A | 2/1986 | Schieble et al. | 370/85 |
| 4,599,598 A | 7/1986 | Komoda et al. | 340/310 A |
| 4,636,771 A | 1/1987 | Ochs | 340/310.05 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 379/66 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzemeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 358/86 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A * | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A * | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,801,643 A | 9/1998 | Williams et al. | 340/870.02 |
| 5,802,102 A | 9/1998 | Davidovici | 375/152 |
| 5,805,053 A | 9/1998 | Patel et al. | 340/310.01 |
| 5,818,127 A | 10/1998 | Abraham | 307/106 |
| 5,818,821 A | 10/1998 | Schurig | 370/293 |
| 5,828,293 A | 10/1998 | Rickard | 340/310.04 |
| 5,835,005 A | 11/1998 | Furukawa et al. | 340/310.01 |
| 5,847,447 A | 12/1998 | Rozin et al. | 257/678 |
| 5,850,114 A | 12/1998 | Froidevaux | 307/105 |

| | | | |
|---|---|---|---|
| 5,856,776 A | 1/1999 | Armstrong et al. | 340/310.01 |
| 5,864,284 A | 1/1999 | Sanderson et al. | 340/310.01 |
| 5,870,016 A | 2/1999 | Shresthe | 340/310.01 |
| 5,880,677 A | 3/1999 | Lestician | 340/825.06 |
| 5,881,098 A | 3/1999 | Tzou | 375/152 |
| 5,892,430 A | 4/1999 | Wiesman et al. | 340/310.01 |
| 5,892,758 A | 4/1999 | Argyroudis | 370/335 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,937,003 A | 8/1999 | Sutterlin et al. | 375/208 |
| 5,937,342 A | 8/1999 | Kline | 455/402 |
| 5,949,327 A | 9/1999 | Brown | 340/310.01 |
| 5,952,914 A | 9/1999 | Wynn | 340/310.01 |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.02 |
| 5,994,998 A | 11/1999 | Fisher et al. | 340/310.01 |
| 5,994,999 A | 11/1999 | Ebersohl | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,037,857 A | 3/2000 | Behrens et al. | 340/310.03 |
| 6,040,759 A | 3/2000 | Sanderson | 340/310.01 |
| 6,091,932 A | 7/2000 | Langlais | 455/5.1 |
| 6,104,707 A | 8/2000 | Abraham | 370/295 |
| 6,121,765 A | 9/2000 | Carlson | 323/359 |
| 6,140,911 A | 10/2000 | Fisher et al. | 340/310.01 |
| 6,141,634 A | 10/2000 | Flint et al. | 703/18 |
| 6,144,292 A | 11/2000 | Brown | 340/310.02 |
| 6,151,330 A | 11/2000 | Liberman | 370/449 |
| 6,151,480 A | 11/2000 | Fischer et al. | 340/310.01 |
| 6,157,292 A | 12/2000 | Piercy et al. | 340/310.01 |
| 6,172,597 B1 | 1/2001 | Brown | 340/310.02 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,229,434 B1 | 5/2001 | Knapp et al. | 340/310.01 |
| 6,239,722 B1 | 5/2001 | Colton et al. | 340/870.02 |
| 6,255,805 B1 | 7/2001 | Papalia et al. | 323/207 |
| 6,255,935 B1 | 7/2001 | Lehmann et al. | 340/310.07 |
| 6,275,144 B1 | 8/2001 | Rumbaugh | 340/310.01 |
| 6,282,405 B1 | 8/2001 | Brown | 725/79 |
| 6,297,729 B1 | 10/2001 | Abali et al. | 340/310.01 |
| 6,297,730 B1 | 10/2001 | Dickinson | 340/310.01 |
| 6,300,881 B1 | 10/2001 | Yee et al. | 340/870.02 |
| 6,313,738 B1 | 11/2001 | Wynn | 340/310.03 |
| 6,317,031 B1 | 11/2001 | Rickard | 340/310.03 |
| 6,331,814 B1 | 12/2001 | Albano et al. | 340/310.01 |
| 6,335,672 B1 * | 1/2002 | Tumlin et al. | 336/175 |
| 6,373,376 B1 | 4/2002 | Adams et al. | 340/310.01 |
| 6,384,580 B1 | 5/2002 | Ochoa et al. | 323/207 |
| 6,396,391 B1 | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,417,762 B1 | 7/2002 | Comer | 340/310.01 |
| 6,425,852 B1 | 7/2002 | Epstein et al. | 600/13 |
| 6,441,723 B1 | 8/2002 | Mansfield, Jr. et al. | 340/310.01 |
| 6,449,318 B1 | 9/2002 | Rumbaugh | 375/309 |
| 6,452,482 B1 | 9/2002 | Cern | 340/310.01 |
| 6,480,510 B1 | 11/2002 | Binder | 370/502 |
| 6,486,747 B1 | 11/2002 | DeCramer et al. | 333/25 |
| 6,492,897 B1 | 12/2002 | Mowery, Jr. | 340/310.01 |
| 6,496,104 B1 | 12/2002 | Kline | 340/310.01 |
| 6,504,357 B1 | 1/2003 | Hemminger et al. | 340/310.01 |
| 6,507,573 B1 | 1/2003 | Brandt et al. | 370/335 |
| 6,515,485 B1 | 2/2003 | Bullock et al. | 324/601 |
| 6,522,626 B1 | 2/2003 | Greenwood | 370/208 |
| 6,522,650 B1 | 2/2003 | Yonge, III et al. | 370/390 |
| 6,549,120 B1 | 4/2003 | deBuda | 340/310.01 |
| 6,577,231 B1 | 6/2003 | Litwin, Jr. et al. | 340/310.01 |
| 6,590,493 B1 | 7/2003 | Rasimas | 340/310.01 |
| 6,611,134 B1 | 8/2003 | Chung | 324/74 |
| 6,624,532 B1 | 9/2003 | Davidow et al. | 307/39 |
| 6,646,447 B1 | 11/2003 | Cern et al. | 324/539 |
| 6,650,249 B1 | 11/2003 | Meyer et al. | 340/870.02 |
| 6,667,685 B1 | 12/2003 | Wasaki et al. | 340/310.03 |
| 6,668,058 B1 | 12/2003 | Grimes | 379/322 |
| 6,683,531 B1 | 1/2004 | Diamanti et al. | 340/310.01 |
| 6,686,832 B1 | 2/2004 | Abraham | 340/310.01 |
| 6,696,925 B1 | 2/2004 | Aiello, Jr. | 340/310.01 |
| 6,785,532 B1 | 8/2004 | Rickard | 455/402 |
| 6,785,592 B1 | 8/2004 | Smith et al. | 700/291 |
| 6,788,745 B1 | 9/2004 | Lim et al. | 375/297 |
| 6,844,809 B1 | 1/2005 | Manis et al. | 340/310.02 |
| 2001/0038329 A1 | 11/2001 | Diamanti et al. | 340/310.01 |
| 2001/0038343 A1 | 11/2001 | Meyer et al. | 340/870.02 |
| 2001/0052843 A1 | 12/2001 | Wiesman et al. | 340/310.01 |
| 2001/0054953 A1 | 12/2001 | Kline | 340/310.01 |
| 2002/0010870 A1 | 1/2002 | Gardner | 713/300 |
| 2002/0014884 A1 | 2/2002 | Chung | 324/74 |
| 2002/0027496 A1 | 3/2002 | Cern | 340/310.01 |
| 2002/0041228 A1 | 4/2002 | Zhang | 340/310.01 |
| 2002/0048368 A1 | 4/2002 | Gardner | 380/277 |
| 2002/0060624 A1 | 5/2002 | Zhang | 340/310.01 |
| 2002/0071452 A1 | 6/2002 | Abraham | 370/480 |
| 2002/0080010 A1 | 6/2002 | Zhang | 340/310.06 |
| 2002/0095662 A1 | 7/2002 | Ashlock et al. | 717/136 |
| 2002/0097953 A1 | 7/2002 | Kline | 385/24 |
| 2002/0098867 A1 | 7/2002 | Meiksen et al. | 455/560 |
| 2002/0098868 A1 | 7/2002 | Meiksen et al. | 455/560 |
| 2002/0105413 A1 | 8/2002 | Cern | 340/310.01 |
| 2002/0109585 A1 | 8/2002 | Sanderson | 340/310.01 |
| 2002/0110310 A1 | 8/2002 | Kline | 385/15 |
| 2002/0110311 A1 | 8/2002 | Kline | 385/15 |
| 2002/0118101 A1 * | 8/2002 | Kline | 340/310.01 |
| 2002/0121963 A1 | 9/2002 | Kline | 340/310.01 |
| 2002/0140547 A1 | 10/2002 | Litwin, Jr. et al. | 340/310.01 |
| 2002/0154000 A1 | 10/2002 | Kline | 340/310.01 |
| 2002/0171535 A1 | 11/2002 | Cern | 340/310.07 |
| 2003/0007570 A1 | 1/2003 | Kim et al. | 375/303 |
| 2003/0007576 A1 | 1/2003 | Alavi et al. | 375/329 |
| 2003/0062990 A1 | 4/2003 | Schaeffer, Jr. et al. | 340/310.01 |
| 2003/0067910 A1 | 4/2003 | Razazian et al. | 370/352 |
| 2003/0090368 A1 | 5/2003 | Ide | 340/310.06 |
| 2003/0103307 A1 | 6/2003 | Dostert | 361/113 |
| 2003/0107477 A1 | 6/2003 | Ide | 340/310.01 |
| 2003/0129978 A1 | 7/2003 | Akiyama et al. | 455/426.1 |
| 2003/0149784 A1 | 8/2003 | Ide | 709/231 |
| 2003/0179080 A1 | 9/2003 | Mollenkopf et al. | 340/310.01 |
| 2003/0184433 A1 | 10/2003 | Zalitzky et al. | 340/310.06 |
| 2003/0210734 A1 | 11/2003 | Kaku | 375/148 |
| 2003/0227373 A1 | 12/2003 | Lou et al. | 340/310.01 |
| 2003/0232599 A1 | 12/2003 | Dostert | 455/66.1 |
| 2004/0001438 A1 | 1/2004 | Aretz | 370/232 |
| 2004/0037317 A1 | 2/2004 | Zalitzky et al. | 370/466 |
| 2004/0054425 A1 | 3/2004 | Elmore | 700/1 |
| 2004/0064782 A1 | 4/2004 | Lerner et al. | 714/800 |
| 2004/0174851 A1 | 9/2004 | Zalitzky et al. | 370/338 |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |

| | | |
|---|---|---|
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 A3 | 2/1998 |
| EP | 0 913 955 A2 | 5/1999 |
| EP | 0 933 883 A2 A3 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50628 A1 | 7/2001 |
| WO | 01/50629 A1 | 7/2001 |
| WO | 01/50625 A2 A3 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | WO02065684 A2 * | 8/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/010896 A1 | 2/2003 |
| WO | 03/30396 A2 | 4/2003 |
| WO | 03/009083 A3 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |

OTHER PUBLICATIONS

HomePlug™Powerline Alliance, HomePlug Initial Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initial Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power–Line Carrier Applications, A Report by the Power System Communications Committee, *IEEE Transactions on Power Apparatus and Systems,* vol. PAS–99, No. 6, Nov./Dec. 1980, pp. 2334–2337.

De Wilde, W. R. et al., "Upwards to a Reliable Bi–Directional Communication Link on the LV Power Supplies for Utility Services: Field Tests in Belgium," pp. 168–172.

Tanaka, M., "Transmission Characteristics of a Power Line Used for Data Communications at High Frequencies," IEEE Transactions on Consumer Electronics, Feb. 1989, vol. 35, No. 1, pp. 37–42.

Hasler, E. F. et al., "Communication Systems Using Bundle Conductor Overhead Power Lines," IEEE Transactions on Power Apparatus and Systems, Mar./Apr. 1975, vol. PAS–94, No. 2, pp. 344–349.

IEEE Guide for Power–Line Carrier Applications, ANSI/IEEE Std 643–1980, ©1980 by The Institute of Electrical and Electronics Engineers, Inc., pp. 1–80.

Hatori, M. et al., "Home Informatization and Standardization of Home Bus," IEEE Transactions on Consumer Electronics, Aug. 1986, vol. CE–32, No. 3, pp. 542–549.

Hunt, J. M. et al., "Electrical Energy Monitoring and Control System for the Home," IEEE Transactions on Consumer Electronics, Aug. 1986, vol. CE–32, No. 3, pp. 578–583.

Gutzwiller, F. W. et al., "Homenet: A Control Network for Consumer Applications," IEEE Transactions on Consumer Electronics, Aug. 1983, vol. CE–29, No. 3, pp. 297–304.

Burrascano, P. et al., "Digital Signal Transmission on Power Line Carrier Channels: An introduction," IEEE Transactions on Power Delivery, Jan. 1987, vol. PWRD–2, No. 1, pp. 50–56.

Burr, A. G. et al., "Effect of HF Broadcast Interference on PowerLine Telecommunications Above 1 MHz," ©1998 IEEE, pp. 2870–2875.

Onunga, J. et al., "Distribution Line Communications Using CSMA Access Control with Priority Acknowledgements," IEEE Transactions on Power Delivery, Apr. 1989, vol. 4, No. 2, pp. 878–886.

Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321–326.

Meng, H. et al., "A Transmission Line Model for High–Frequency Power Line Communication Channel," ©2002, IEEE, pp. 1290–1295.

Burrascano, P. et al., "Performance Evaluation of Digital Signal Transmission Channels on Coronating Power Lines," ©1988 IEEE, pp. 365–368.

DiClementi, D. A. et al., "Electrical Distribution System Power Line Characterization," ©1996 IEEE, pp. 271–276.

Abraham, K. C. et al., "A Novel High–Speed PLC Communication Modem," IEEE Transactions on Power Delivery, Oct. 1992, vol. 7, No. 4, pp. 1760–1768.

Yoshitoshi, M. et al., "Proposed Interface Specifications for Home Bus," IEEE Transactions on Consumer Electronics, Aug. 1986, vol. CE–32, No. 3, pp. 550–557.

O'Neal, Jr., J.B., "The Residential Power Circuit as a Communication Medium," IEEE Transactions on Consumer Electronics, Aug. 1986, vol. CE–32, No. 3, pp. 567–577.

Dostert, K., "EMC Aspects of High Speed Powerline Communications," Proceedings of the 15$^{th}$ International Wroclaw Symposium and Exhibition on Electromagnetic Capability, Jun. 27–30, 2000; Wroclaw, Poland, pp. 98–102.

Piety, R. A., "Intrabuilding Data Transmission Using Power–Line Wiring," Hewlett–Packard Journal, May 1987, pp. 35–40.

Patent Abstracts of Japan, Japanese Publication No. 10200544 A2, published Jul. 31, 1998, (Matsushita Electric Works, LTD).

Tohoku Electric Power, Co., Inc., "Tohoku Electric Develops High–Speed Communications System Using Power Distribution Lines," *Tohoku Currents*, Spring 1998, 8(1), 2 pages (http://www.tohokuepco.co.jp/profil/kurozuc_vol8_1/art04.htm).

Power Line Communications Conference entitled, "PLC, A New Competitor in Broadband Internet Access," Dec. 11–12, 2001, Washington, D.C., 60 pages.

Rivikin, S. R., "Co–Evolution of Electric & Telecommunications Networks," *the Electricity Journal*, May 1998, 71–76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages No date.

"Power Line Communications Solutions", No date www.echelon.com/products/oem/transceivers/powerline/defautl.htm, 2 pages.

"Texas Instruments: System Block Diagrams; Power Line Communication (Generic)", No date http://focus.ti.com/docs/apps/catalog/resources/blockdiagram.jhtml?bdld=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low–Voltage Electrical Installations in the Frequency Band 3kHz to 148.5kHz–Part 4: Filters at the Interface of the Indoor and Outdoor Electricity Network", *CLC SC 105A (Secretariat)* May 1992, 62, 1–11.

"Intellon Corporation Test Summary for Transformerless Coupler Study", *Intellon No News Wires*, Dec. 24, 1998, DOT/NHTSA Order No. DTNH22–98–P–07632, pp. 1–18.

EMETON *Automated Distribution System*, ABB Power T & D Company, Inc., Jan. 1990, Raleigh, North Carolina, No. B–919A, 14 pages.

"Dedicated Passive Backbone for Power Line Communications", *IBM Technical Disclosure Bulletin*, Jul. 1997, 40(7), 183–185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT–21 Power Line Transceiver ", *Lonworks Engineering Bulletin*, Echelon, Apr. 1997, pp. 1–22.

Plexeon Logistics, Inc., "Power Line Communications", www.plexeon.com/power.html, 2 pages No date.

"EMETCON Automated Distribution System: Communications Guide", *Westinghouse ABB Power T & D Company Technical Manual 42–6001A*, Sep. 1989, 55 pages.

Abraham, K.C. et al., "A Novel High–Speed PLC Communication Modem", *IEEE Transactions on Power Delivery*, 1992, 7(4), 1760–1768.

J.M. Barstow., "A Carrier Telephone System for Rural Service", *AIEE Transactions*, 1947, 66, 301–307.

Chang, S.S.L., "Power–Line Carrier", *Fundamentals Handbook of Electrical and Computer Engineering*, VolumeII-Communication, Control, Devices and Systems, John Wiley & Sons, 617–627.

Chen, Y–F. et al. "Baseband Transceiver Design of a 128–Kbps Power–Line Modem for Household Applications", *IEEE Transactions on Power Delivery*, 2002, 17(2), 338–344.

Coakley, N.G. et al, "Real–Time Control of a Servosystem Using the Inverter–Fed Power Lines to Communicate Sensor Feedback", *IEEE Transactions on Industrial Electornics*, 1999, 46(2), 360–369.

Esmailian, T. et al., "A Discrete Multiton Power Line Communication System", *Department of Electrical and Computer Engineering*, University of Toronto, Ontario Canada, 2000 IEEE, pp. 2953–2956.

Kawamura, A. et al., "Autonomous Decentralized Manufacturing System Using High–speed Network with Inductive Transmission of Data and Power", *IEEE*, 1996, 940–945.

Kilbourne, B. "EEI Electric Perspectives: The Final Connection", www.eei.org/ep/editorial/Jul–01/0701conenct.htm, 7 pages Jul./Aug. 2001.

Kim, W–O., et al., "A Control Network Architecture Based on EIA–709.1 Protocol for Power Line Data Communications", *IEEE Transactions on Consumer Electronics*, 2002, 48(3), 650–655.

Lim, C.K. et al., "Development of a Test Bed for HighSpeed Power Line Communications", School of Electrical and Electronic Engineering, Nanyang Technological University, Singapore, *IEEE*, 2000, 451–456.

Lokken, G. et al., "The Proposed Wisconsin electric Power Company Load Management System Using Power Line Carrier Over Distribution Lines", *1976 National Telecommunications Conference, IEEE*, 1976, 2.2–12.2–3.

Marthe, E. et al., "Indoor Radiated Emission Associated with Power Line Communication Systems,", *Swiss Federal Institute of Technology Power Systems Laboratory IEEE,* 2001, 517–520.

Naredo, J.L. et al., "Design of Power Line Carrier Systems on Multitransposed Delta Transmission Lines", *IEEE Transactions on Power Delivery,* 1991, 6(3), 952–958.

Nichols, K., "Build a Pair of Line–Carrier Modems", *CRC Electronics–Radio Electronics,* 1988, 87–91.

Okazaki, H, et al., "A Transmitting, and Receiving Method for CDMA Communications Over Indoor Electrical Power Lines", *IEEE,* 1998, pp. VI–522–VI–528.

B. Don Russell, "Communication Alternatives for Distribution Metering and Load Management", *IEEE Transactions on Power Apparatus and Systems,* 1980, vol. PAS–99(4), pp. 1448–1455.

Sado, WN. et al., "Personal Communication on Residential Power Lines– Assessment of Channel Parameters", *IEEE,* 532–537.

International Search Report dated May 2, 2001, from PCT/US01/01810.

International Search dated Jul. 16, 2001, from PCT/US01/12699.

International Search Report dated Oct. 22, 2001, from PCT/US01/12291.

International Search Report dated Jun. 5, 2002, from PCT/US01/48064.

Written Opinion dated May 15, 2002, from PCT/US01/12699.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

Dostert, K., Powerline Communications, Ch. 5, pp. 286, 288–292, Prentice Hall PTR, Upper Saddle River, NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31–Apr. 2, 2004] 6 pages.

* cited by examiner

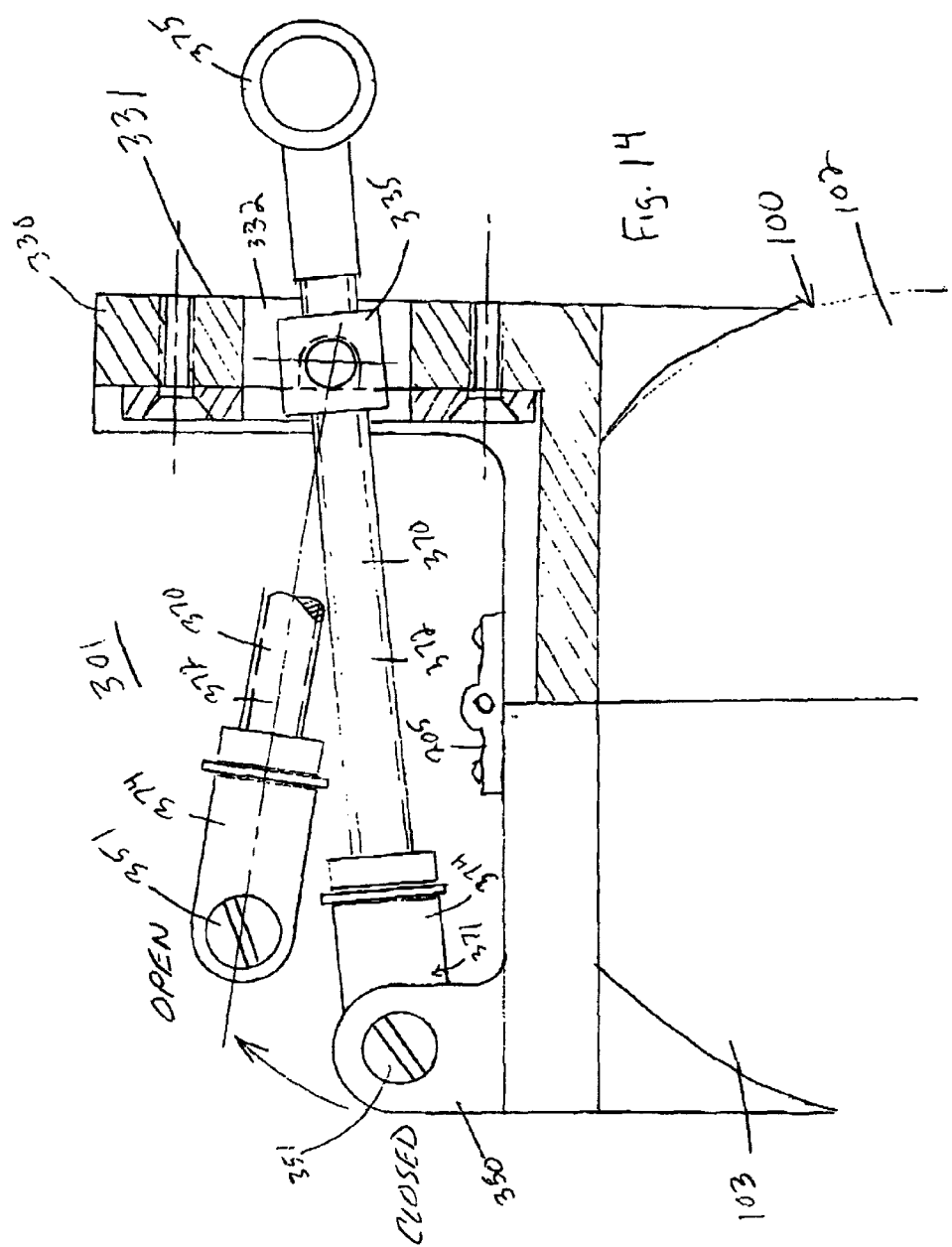

POWER LINE COUPLING DEVICE AND METHOD OF USING THE SAME

FIELD OF THE INVENTION

The present invention generally relates to data communication over a power distribution system and more particularly, to a device for coupling to a power line to provide data communications through the power line and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power distribution communication system. In other words, existing power lines, that already have been run to many homes and offices, can be used to carry data signals to and from the homes and offices. These data signals are communicated on and off the power lines at various points in the power distribution communication system, such as, for example, near homes, offices, Internet service providers, and the like.

While the concept may sound simple, there are many challenges to overcome in order to use power lines for data communication. Power distribution systems include numerous sections, which transmit power at different voltages. The transition from one section to another typically is accomplished with a transformer. The sections of the power line distribution system that are connected to the customers typically are low voltage (LV) sections having a voltage between 100 volts and 240 volts, depending on the system. In the United States, the low voltage section typically is about 120 volts (120V). The sections of the power distribution system that provide the power to the low voltage sections are referred to as the medium voltage (MV) sections. The voltage of the MV section is in the range of 1,000 Volts to 100,000 volts. The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz power signals) and impeding high frequency signals (e.g., frequencies typically used for data communication) from passing through the transformer. As such, power distribution communication systems face the challenge of passing the data signals around the distribution transformers.

To bypass the distribution transformer, the bypassing system needs a method of coupling data to and from the medium voltage power line. As discussed, medium voltage power lines can operate from about 1000 V to about 100 kV, and often have high current flows. Consequently, coupling to a medium voltage power line gives rise to safety concerns for the user installing the coupling device. In addition, the coupling device should be designed to operate to provide safe and reliable communication of data signals with a medium voltage power line—carrying high power—in all outdoor environments such as extreme heat, cold, humidity, rain, high shock, and high vibration. Also, coupling around the transformer raises concern that dangerous MV voltage levels may be provided to the customer premises on the data line.

In addition, a coupling device should be designed so that is does not significantly compromise the signal-to-noise ratio or data transfer rate and facilitates bi-directional communication. Furthermore, the coupling device is preferably designed so that it can be installed without disrupting power to customers. These and other advantages are provided by various embodiments of the present invention.

SUMMARY OF THE INVENTION

One objective of the invention is to provide a coupling device for coupling to a power line to facilitate data communications through the power line and method of using the same.

Another objective of the invention is to provide a coupling device for coupling to a power line to conduct communications signals to and from the power line.

Still another objective of the present invention is to provide a coupling device that can be installed on an uninsulated power line carrying power, thereby alleviating the need to disconnect power from the power line and disrupt power to power customers.

Another objective of the present invention is to provide a coupling device that does not require modification of the existing power line.

Yet another objective of the present invention is to provide a coupling device that is reliable and economic to manufacture.

These and other objectives are achieved by one embodiment of the present invention comprising a housing, a first fastening member attached to said housing and coupled to the power line, a second fastening member attached to the housing and coupled to the power line, an inductor providing an impedance to data transmissions between the first fastening member and the second fastening member; a first conductor having a first end electrically coupled to the first fastening member; and a second conductor having a first end electrically coupled to the second fastening member. The second ends of the first conductor and second conductor providing data signals to a connector. In addition, the housing is comprised of a first housing portion and second housing portion that are pivotally coupled to each other to allow transition between an open configuration and a closed configuration. Finally, the housing may include a transformer secured therein for coupling power to the connector.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 14 is a partial cross-sectional view of another handle assembly of an example embodiment of a coupling device according to the present invention.

DETAILED DESCRIPTION OF ILLUSTRATIVE EMBODIMENTS

Power distribution systems include components for power generation, power transmission, and power delivery. A transmission substation is typically used to increase the voltage from power generation source to high voltage (HV) levels for long distance transmission on high voltage transmission lines to a substation. Typical voltages found on high voltage transmission lines range from 69 to in excess of 800 kilovolts (kV).

In addition to high voltage transmission lines, power distribution systems include medium voltage power lines and low voltage power line. As discussed, medium voltage typically is from about 1000 V to about 100 kV and low voltage is typically from about 100 V to about 240 V. Transformers typically are used to convert between the respective voltage portions, e.g., between the high voltage section and the medium voltage section and between the medium voltage section and the low voltage section. Transformers have a primary side for connection to a first voltage (e.g., the MV section) and a secondary side for outputting another (usually lower) voltage (e.g., the LV section). Such transformers are often referred to as step down transformers because they typically "step down" the voltage to some lower voltage. Transformers, therefore, provide voltage conversion for the power distribution system. Thus, power is carried from substation transformer to a distribution transformer over one or more medium voltage power lines. Power is carried from the distribution transformer to the customer premises via one or more low voltage lines.

In addition, a distribution transformer may function to distribute one, two, three, or more phase currents to the customer premises, depending upon the demands of the user. In the United States, for example, these local distribution transformers typically feed anywhere from one to ten homes, depending upon the concentration of the customer premises in a particular area.

Distribution transformers may be pole-top transformers located on a utility pole, pad-mounted transformers located on the ground, or transformers located under ground level.

Figure 1:
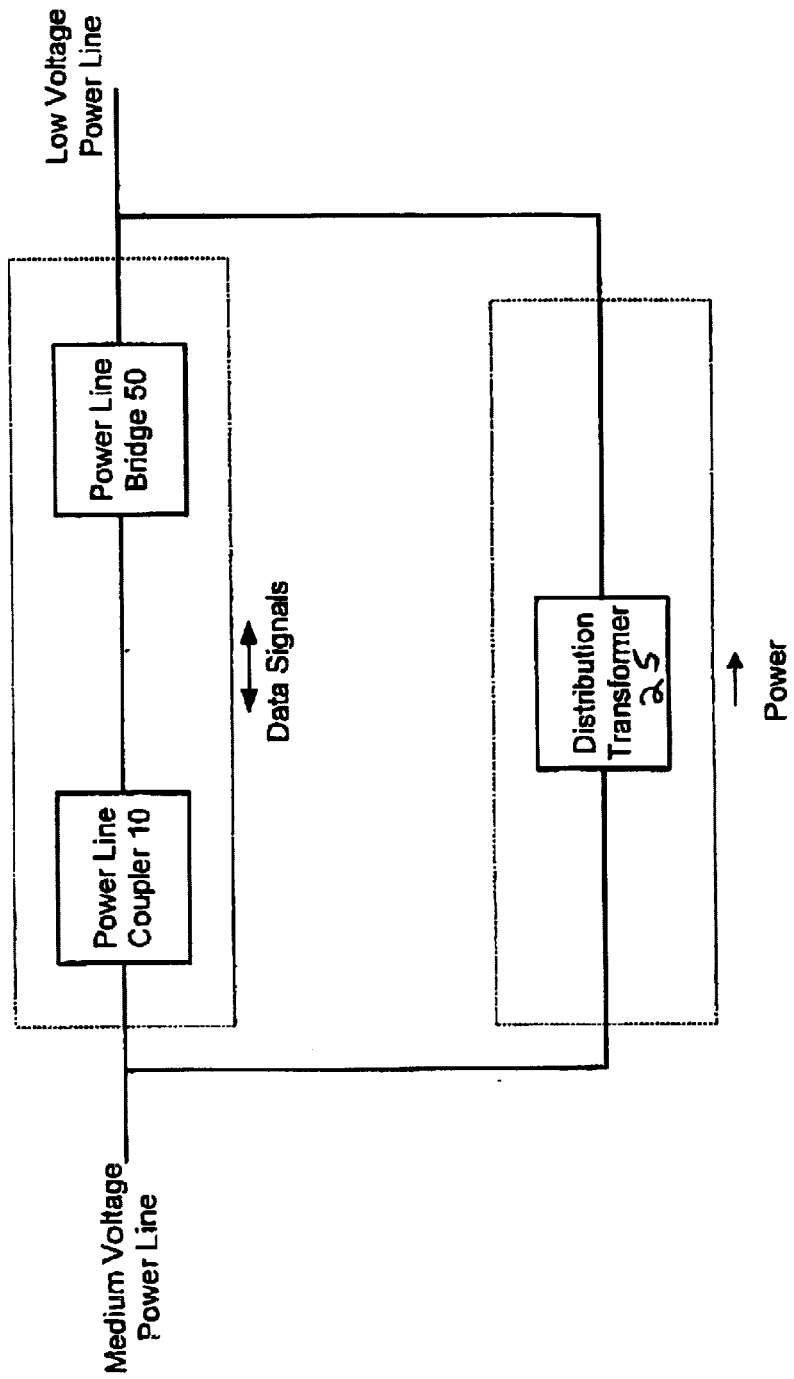
FIG. 1 is a schematic representation illustrating a portion of an example data communication system in which the present invention may be used.

The coupling device of the present invention is designed to be used as part of a power line coupler 10, which, together with and a power line bridge 50, form the bypass system to communicate data signals around the transformer that would otherwise filter such data signals, preventing them from passing through the transformer. FIG. 1 is a schematic representation illustrating such a bypass system having a power line coupler 10 and power line bridge 50.

The power line coupler 10 interfaces data signals to medium voltage power lines on the primary side of the transformer 25 and the power line bridge 50 interfaces data signals to low voltage power lines on the secondary side of the transformer 25. The power line coupler 10 provides electrical isolation between the transformer primary side (e.g., the MV section) and secondary side (e.g., LV section), thereby preventing substantial power flow through the power line coupler and the power line bridge. It should be appreciated that the functionality of the power line coupler 10 and the power line bridge 50 can be included in one device or distributed in more than one device.

The power line coupler 10 includes a power line coupling device that conducts data signals to and from the power line. The power line coupler 10 may include additional circuitry to condition the data signal, to handle bi-directional signal transfer, to enable the use of an electrical isolator, to provide operational power from the power line, to convert data signals to a different format (e.g., for transmission to the user premises), and may be designed to be self-contained.

The power line coupler 10 and power line bridge 50 communicate with each other, thereby allowing data signals to bypass the transformer, thus avoiding the filtering of the high frequency data signal that otherwise would occur in the transformer 25. Lower frequency power signals continue to flow from medium voltage power lines to low voltage power lines through the transformer 25. As discussed, the power line coupler 10 provides electrical isolation between the medium voltage power line and low voltage power lines by substantially preventing power from flowing through the bypass system.

The electrical isolation may include a non-electrical signal path (i.e., for transmission of a signal that is non-electrical). A non-electrical signal may be a light signal, a radio frequency signal, a microwave signal, and the like. The power line coupler 10 transmits the signal over the non-electrical signal path (or other path). The power line bridge 50 receives the non-electrical signal and conditions the signal for communication to the customer premises over the low voltage power lines or through another communication medium such over a telephone line, coaxial cable, fiber optic cable, or wirelessly.

As discussed, the power line coupler 10 includes a coupling device for conducting data signals to and from the power line. FIGS. 2–5, and 12 illustrate an example embodiment of a coupling device 100 according to the present invention. The coupling device 100 of this example embodiment is designed to couple with a medium voltage power line that is not insulated, such as the overhead transmission lines of the United Stated that typically include two or more wires running parallel to each other with an air gap between them acting as a dielectric.

The coupling device 100 in this example embodiment includes a housing 101 having a front housing portion 103 and a back housing portion 102 that are mechanically coupled to each other by a pair of hinges 205. Each housing portion 102, 103 may be milled from a block of Noryl™, which is a commercially available elastomer manufactured by General Electric. However, the housing portions 102, 103 may also be created with injection molding or through other means.

Figure 6:
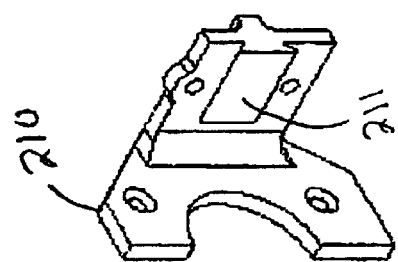
FIG. 6 is a perspective view of a pair of clamp brackets of an example embodiment of a coupling device according to the present invention.
Figure 6:
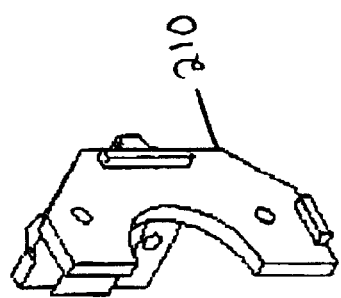

The hinges 205 permit the front and back housing portions 103, 102 to pivot from an open configuration to a closed configuration. Clamp brackets 210, shown in detail in FIG. 6, are mounted to the ends of the back housing portion 102 with mounting screws (not shown) that are received by mounting holes in the ends of the back housing portion 102.

A hot wire clamp 220 is attached to each clamp bracket 210 with screws that extend through mounting holes in the clamp bracket 210 and into the hot wire clamp 220. As will be discussed in more detail below, the hot wire clamps 220 are used for attaching the coupling device 100 to the power line. Suitable hot wire clamps for the example embodiment may be product number AH4GPXB, manufactured by Hubbell Power Systems of Centralia, Mo., and may be modified to mate with the clamp brackets 210 as will be evident to those skilled in the art. In this example embodiment, the hot wire clamps 220 are modified to have mounting holes and a dove tail groove. The dove tail groove is designed to receive the dove tail extension 211 of the respective clamp bracket 210 to which it is mounted. Other hot wire clamps and other types of fastening members may used to accommodate other housing structures and wire sizes/types.

Also mounted to the housing 101 is a handle assembly 301, a connector 401 for providing an electrical connection to the coupling device 100, and a pair of twist clamps 130 for securing the housing 101 in the closed configuration. Suitable hinges for use in this example embodiment include the commercially available hinges from SouthCo, Inc. of Concordville, Pa., identified by part number E6-10-301-20. Likewise, suitable twist clamps for use in this example embodiment include part number K2-3005-51, also manufactured by SouthCo Inc. of Concordville, Pa. These commercially available twist clamps have been modified to include an aperture in the gripping portion that is sized to receive the end of an electric utility safety stick (or bang stick). A suitable connector for use in this embodiment is available from Conxall Corp. of Villa Park, Ill. as part number 14180-7SG-300.

Figure 7:
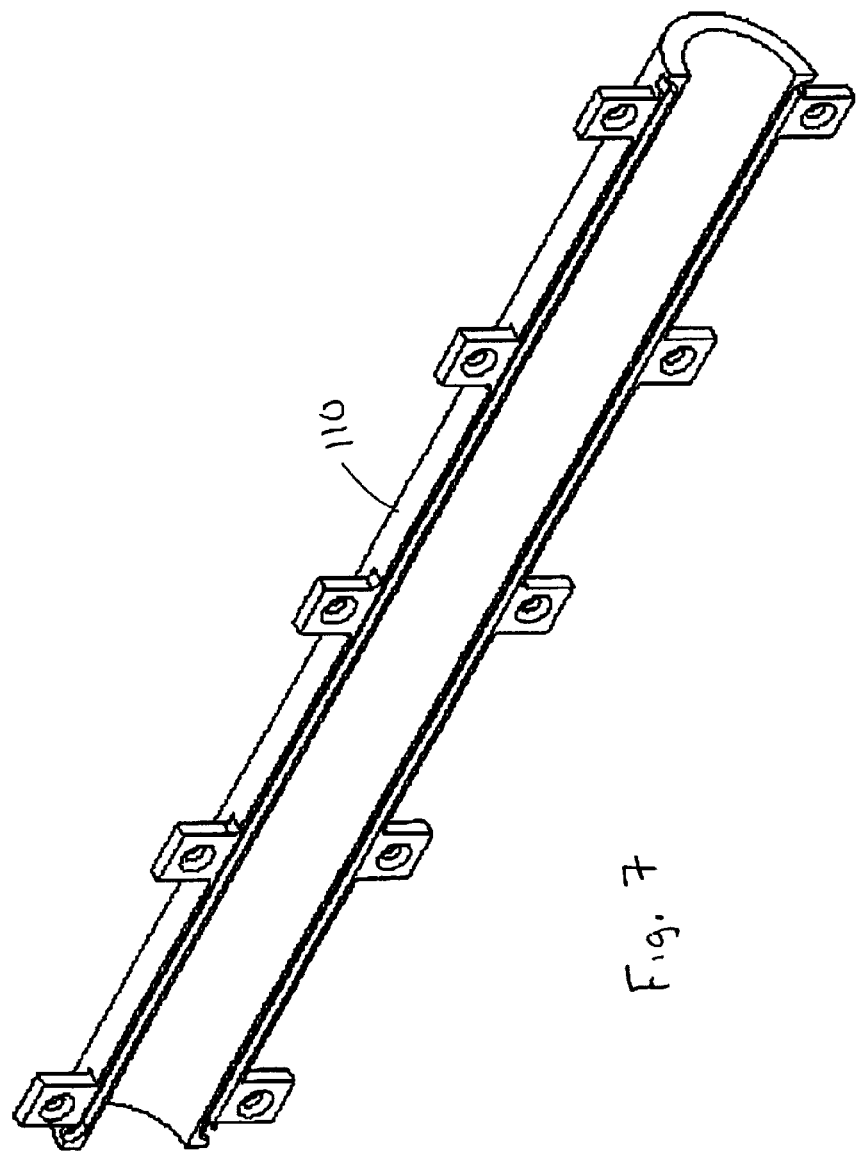
FIG. 7 is a perspective view of a tube portion of an example embodiment of a coupling device according to the present invention.

When the housing 101 is in the closed configuration, a cylindrical opening 105 through the housing 101 allows the power line to pass through the housing. Thus, each of the back housing portion 102 and the front housing portion 103 includes a substantially semicircular recess extending longitudinally along its entire length. A tube portion 101, shown in FIG. 7, is mounted in the semicircular recess of the back housing portion 102 and the front housing portion 103. The tube portions 110 are semicircular in shape, may be manufactured from aluminum, and sized to mate with the semicircular recesses of the back housing portion 102 and front housing portion 103. The tube portions 110 are mounted to the back housing portion 102 and front housing portion 103 with ten mounting screws that extend through the ten mounting apertures of the tube portions 110 and into the corresponding mounting holes designed to receive the mounting screws in the back housing portion 102 and front housing portion 103. Although FIG. 7 provides one example of such a tube portion, it should be appreciated that other configurations also are contemplated.

Thus, in this embodiment, when the housing 101 is in the closed configuration, the tube portions 110 of the back housing portion 102 and front housing portion 103 form the cylindrical opening 105, which acts as a power line passage permitting passage of the power line through the housing of the coupling device 100. In this embodiment, the power line does not contact the passage (i.e., the inside of the tube portions 110), although other embodiments may permit the power line to contact the components defining the passage.

The back housing portion 102 and front housing portion 103 (housing portions 102, 103) are nearly identical internally. Consequently, the following descriptions of the back housing portion 102 apply equally well to the front housing portion 103

The housing portions 102, 103 combine to form first and second core chambers 120a–b, which are separated by a center partition 125. Center partition 125 is disposed along the lateral center line of the housing 101 so that core chamber 120a is adjacent one side of the center line and core chamber 120b is adjacent the other side of the center line.

The core chambers 120a–b are designed to receive and retain the core portions, which in this embodiment form part of one or more transformers. In this example embodiment, only one core 501 is included, which is disposed in core chamber 120b. Other embodiments, however, may include another core disposed in core chamber 120a.

Figure 8:
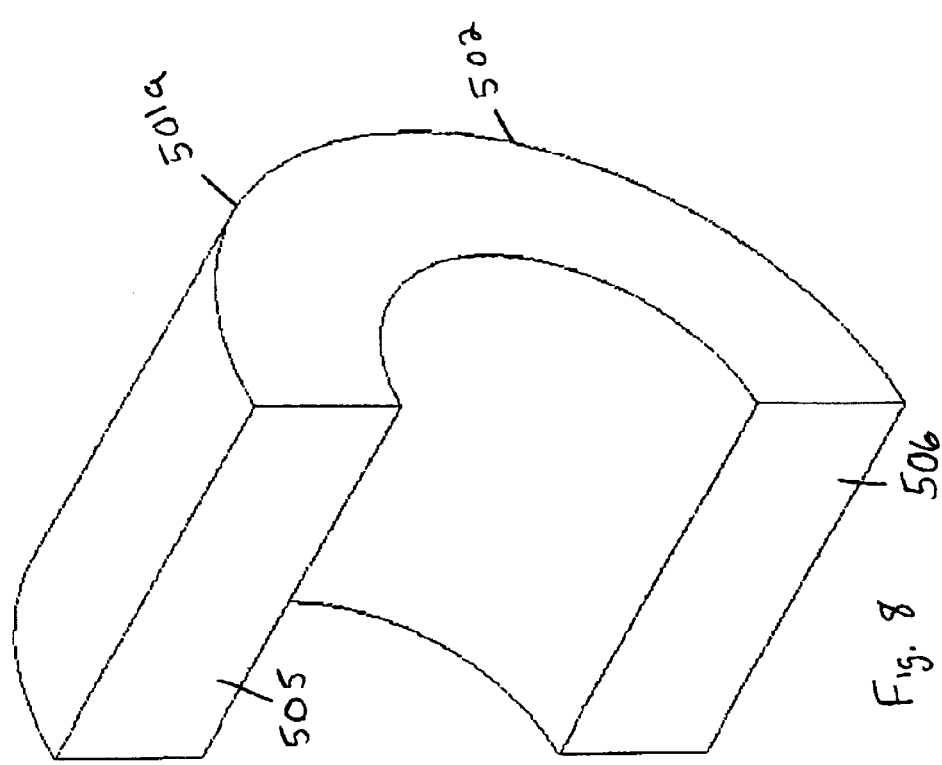
FIG. 8 is a perspective view of a core portion of an example embodiment of a coupling device according to the present invention.

The core 501 is substantially toroidal in shape and formed by two core portions 501a which are shaped substantially as a half of a toroid as shown in FIG. 8. A suitable part, from which the core 501 of this example embodiment may be created, is part number CRAZ-1038-A, available from National-Arnold Magnetic Inc. of Adelanto Calif., which is cut in half to form core portions 501a. Each core portion 501a includes a first mating surface 505 and a second mating surface 506. The mating surfaces 505, 506, in this example embodiment, are sealed with a coating of Parylene™ that will inhibit corrosion of the mating surfaces 505, 506. The inner radius of the core 501 is designed to be slightly larger than the exterior radius of the tube portion 110. In this example embodiment, the core 501 has approximate dimensions of a 0.8 inch inner radius, 1.5 inch outer radius, and 2.0 inch width.

A core portion 501a resides in the core chamber 120b of the back housing portion 102 and of front housing portion 103. When the housing 101 is in the closed configuration, the mating surfaces 505 of each core portion 501a are urged into contact with each other and the mating surfaces 506 of each core portion 501a are urged into contact with each other thereby forming a complete toroid.

The housing 101 also includes one or more urging members (not shown). The urging members urge the core portions 501a against the tube portions 110 (with a synthetic rubber gasket, such as Neoprene™, there between) and towards each other when the housing is in the closed configuration. In this example embodiment, the urging member is a multi-layered synthetic rubber gasket (not shown) attached to the back surface of core chambers 120a–b and is approximately one half inch in thickness. The thickness and other characteristics of the urging member of this embodiment are such that when the housing is in the open configuration, the ends of the core portions 501a (adjacent mating surfaces 505, 506) extend slightly from the back housing portion 102 and front housing portion 103.

The urging member is an elastic device that resists deformation. During assembly, each core portion 501a is placed in the core chamber 120a of its respective housing portion 102, 103 (on top of the gasket) and then tubing portions 110 are mounted to the respective housing portion 102, 103. Mounting of the tubing portions 110 forces each core portion 501a rearward, against the urging member of the core chamber 120b. Thus, when the tubing portions 110 are fully mounted, each core portion 501a is fixed in place because it is forced against the tube portion 110 (with a gasket there between) by the pressure exerted against the rear surface 502 of the core portion 501a by the urging member.

When the housing 101 is in the closed configuration, the rear surface 502 of each core portion 501a is pressed against the urging member (e.g., the gasket). Although the urging member deforms, it resists deformation and urges core portion 501a toward the mating core portion 501a (and vice versa) so that the mating faces 505, 506 of the core portions 501a are pressed tightly together, thereby forming a friction fit and resisting movement with respect to each other.

The back housing portion 102 and front housing portion 103 also combine to form first and second inductor chambers 140a–b. The following description of inductor chamber 140a is also applicable to inductor chamber 140b, as will be evident to one skilled in the art, and is therefore not repeated here.

Each inductor chamber 140 includes an outer inductor chamber 150 and an inner inductor chamber 160, which are separated by an inductor partition 170. Each inductor chamber 140 is adapted to receive one or more inductors. In this example embodiment, the inductor in each chamber is comprised of two ferrite toroids (for a total of eight in the coupling device 100), which act as inductors when the coupling device 100 is installed on the power line. A ferrite toroid suitable for modification and use in this example embodiment is Type 43 Ferrite Core, Part No. 5943003801, manufactured by Kreger Components, Inc., of Roanoke, Va. The total combined inductance of the eight ferrite toroids may be substantially equivalent to an inductor having an inductance in the range of about 0.1 microHenries to 5.0 microHenries. Alternate embodiments, however, may include one or more inductors with values outside of this range.

Figure 9:
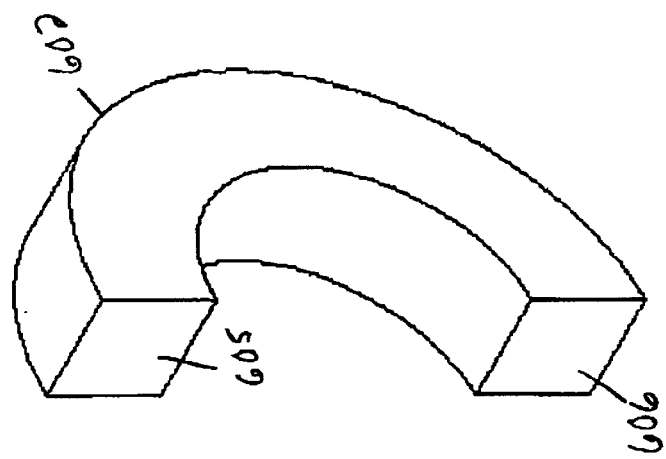
FIG. 9 is a perspective view of an inductor portion of an example embodiment of a coupling device according to the present invention.

Because all of the ferrite inductors in this example embodiment are the same, only one will be described herein. However, it should be appreciated that other embodiments contemplated by the invention may include ferrite inductors having varying sizes and shapes. The inductor is substantially toroidal in shape and formed by two inductor portions 602, which are shaped substantially as a half of a toroid, as shown in FIG. 9. Each inductor portion 602 includes a first mating face 605 and second mating face 606. An inductor portion 602 is disposed in the inductor chambers 140 in both the back housing portion 102 and front housing portion 103. When the housing 101 is in the closed configuration, the mating faces 605 and 606 of each inductor portion 602 in the back housing portion 102 contact with the corresponding inductor portion 602 in the other front portion 103 forming a complete toroid that acts as inductor and provides an impedance to data transmissions.

As is well known to those skilled in the art, manufacturing tolerances sometimes allow components intended to align, to be out of alignment. To ensure that the mating surfaces 605, 606 of the inductor portions 602 mate together properly when the housing is in the closed configuration, a synthetic rubber gasket is disposed on the outer side of the outer inductor chamber 150. The synthetic rubber gasket resists deformation (although it deforms) to urge the inductor portion 602 of the inductor in the outer inductor chamber 150 toward the inductor partition 170. Likewise, a synthetic rubber gasket is positioned on the inner side of inner inductor chamber 160 to urge the inductor portion 602 in the inner inductor chamber 160 toward the inductor partition 170. Thus, the inductors disposed in the inner inductor chamber 160 and outer inductor chamber 150 are both urged toward the inductor partition 170 to ensure that the mating faces 605, 606 of the inductor portions 602 are in alignment when the housing 101 is in the closed configuration.

In addition, this example embodiment also includes an urging member in the inductor chambers, as described with respect to the core, to urge the inductor portions 602 together when the coupling device is in the closed configuration and against the tube portions 110 (with a gasket there between). Thus, when the coupling device 100 is installed on the line, the inductor extends around the circumference of the power line so that at least a portion of the inductor is coupled to the flux of the power line extending through the power line passage.

Figure 2:
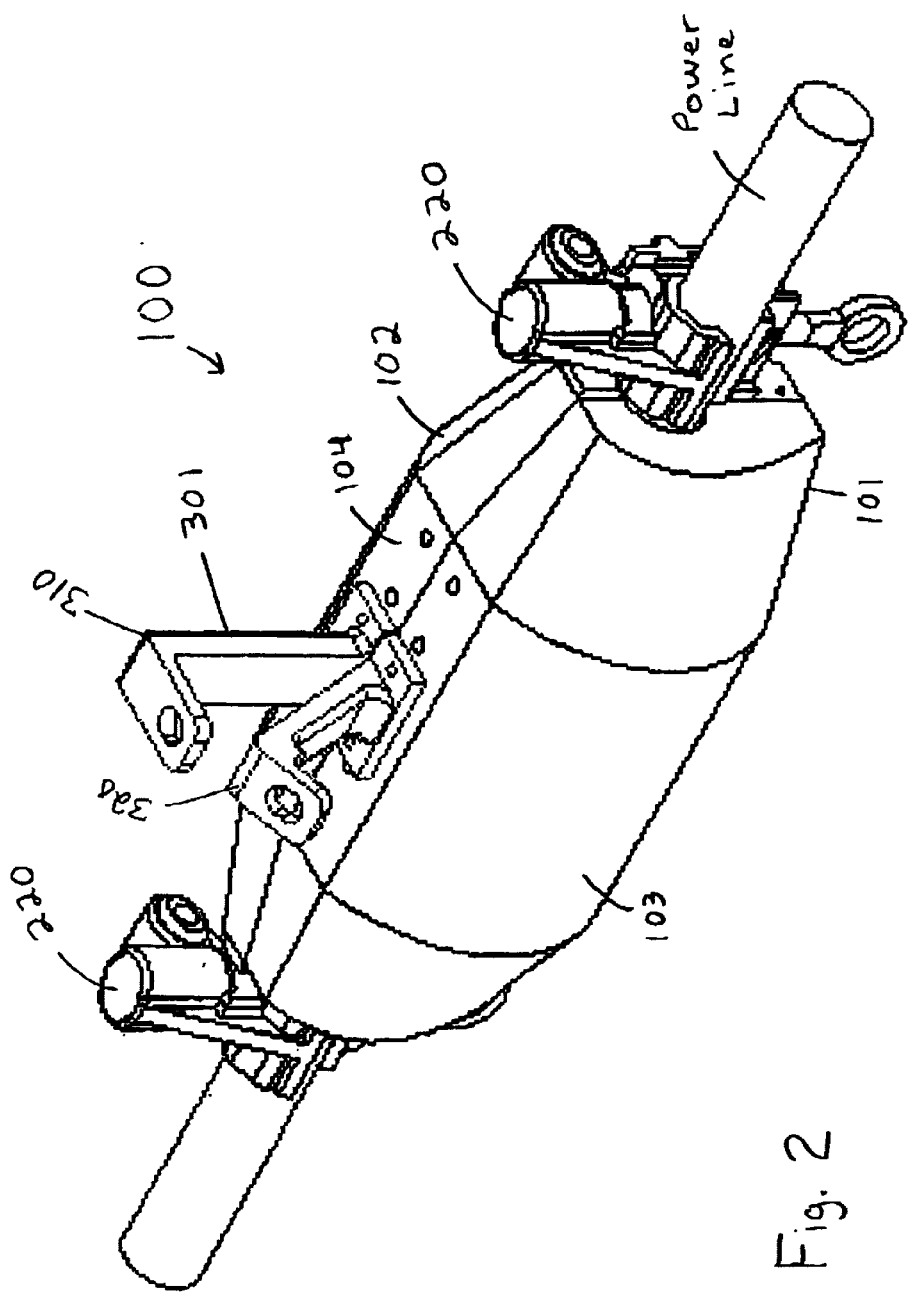
FIG. 2 is a perspective view illustrating the partial assembly of an example embodiment of a coupling device according to the present invention mounted on a power line.
Figure 3:
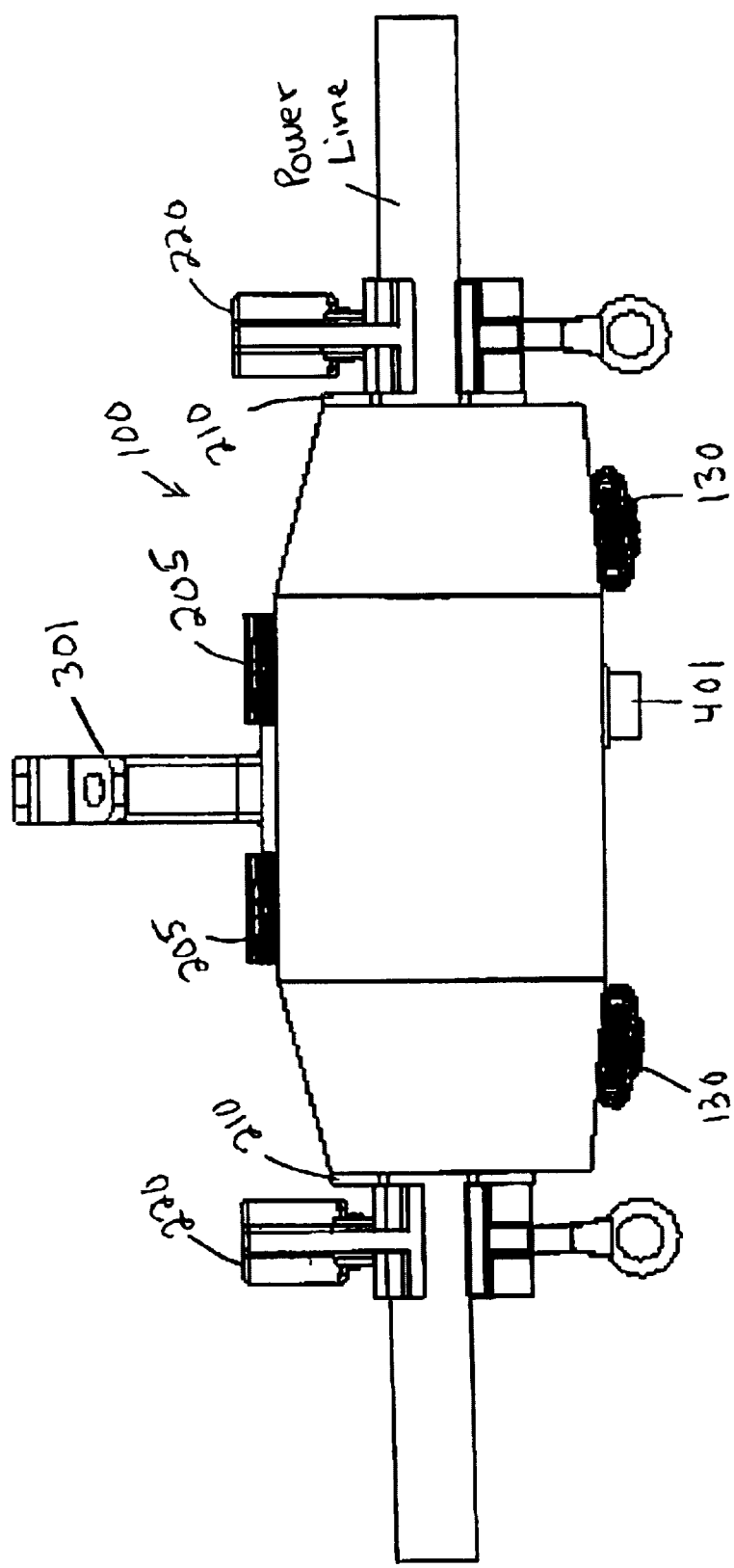
FIG. 3 is a side assembly view illustrating an example embodiment of a coupling device according to the present invention mounted on a power line.
Figure 10:
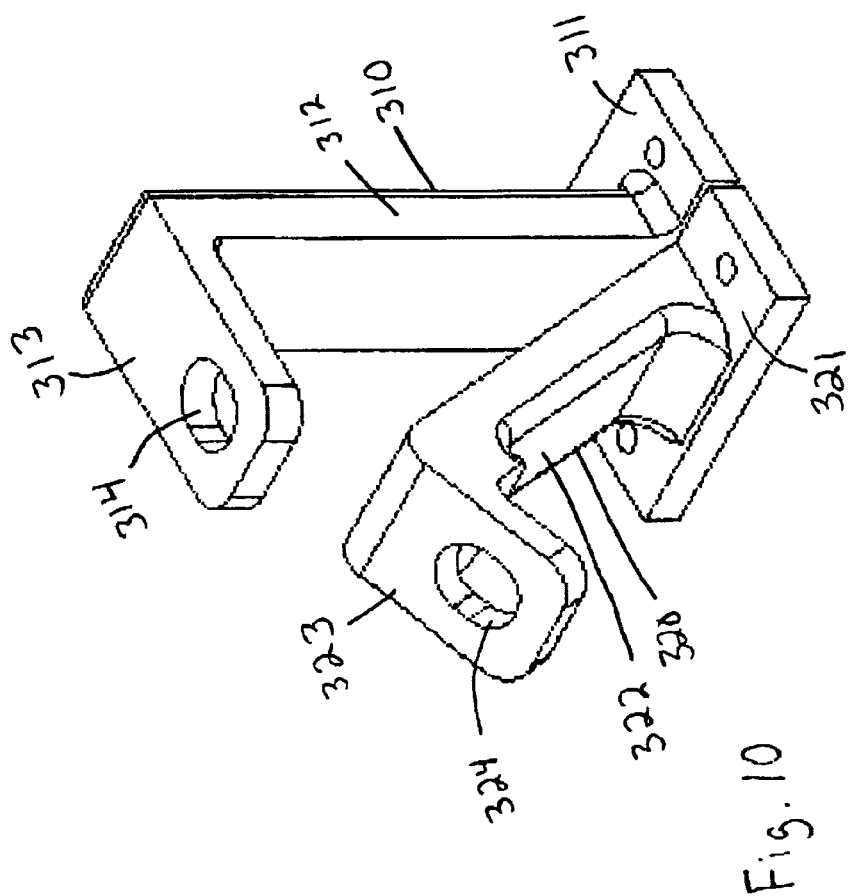
FIG. 10 is a perspective view of a handle assembly of an example embodiment of a coupling device according to the present invention.
Figure 11:
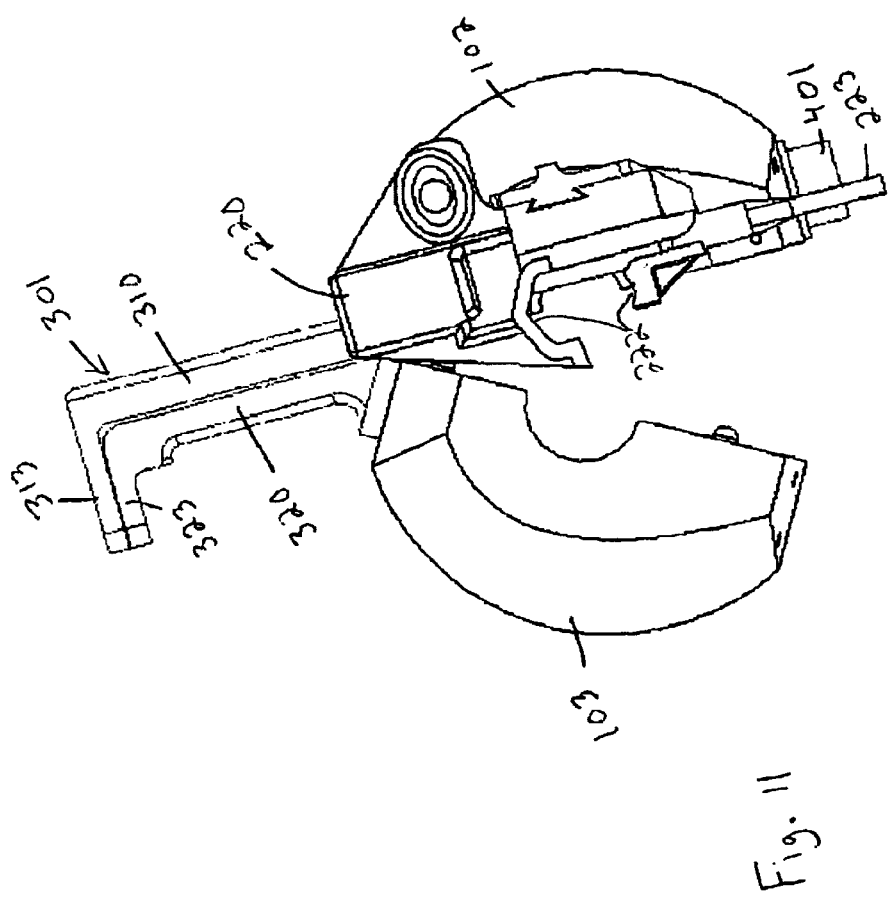
FIG. 11 is a side view of illustrating an example embodiment of a coupling device according to the present invention in the open configuration.

The handle assembly 301 is adapted to receive a bang stick to install the coupling device 100. As is well-known in the industry, a bang stick is an instrument used by electric utility personnel to handle and install devices on power lines. Referring to FIGS. 2, 10, and 11, the handle assembly 301 includes a first handle portion 310 and a second handle portion 320. The first handle portion 310 is mounted to the back housing portion 102 and the second handle portion 320 is mounted to the front housing portion 103. Mounting screws through the handle portions 310, 320 are received in screw holes in their respective housing portions to fixedly attach the handles portions 310, 320, to the housing portions 102, 103.

The first handle portion 310 includes a base 311, a gripping portion 312, and a control member 313. The control member 313 includes an aperture 314 therethrough that is sized to receive and engage the end of the bang stick. The gripping portion 312 extends upward substantially perpendicular to the top surface 104 of the back housing portion 102. The second handle portion 320 includes a base 321, a gripping portion 322, and a control member 323. The control member 323 includes an aperture 324 therethrough that is sized to receive and engage the end of the bang stick. The gripping portion 322 of the second handle portion 320 extends upward at an angle that is thirty degrees from perpendicular to the top surface 105 of the front housing portion 102. Thus, the angle between the first handle portion 310 and the second handle portion 320 is approximately thirty degrees when the coupling device 101 is in the closed configuration.

The gripping portion 320 of the second handle portion 320 is slightly shorter in length than the gripping portion 312 of the first handle portion 310 and is shorter by a magnitude substantially equal to the thickness of the control member 313 of the first handle portion 310.

When the twist clamps 130 are unlocked, gripping the handle assembly 301 urges the second handle portion 320 toward the first handle portion 310 to open the coupling device 100. In the open configuration, the first handle portion 310 and the second handle portion 320 both extend upward perpendicular to the top surface 104 of the back housing portion 102, as best shown in FIG. 11. In addition, the rear side of the gripping portion 322 of the second handle portion 320 is adjacent the front side of the gripping portion 312 of the first handle portion 310. Likewise, in the open configuration the top surface of the control member 323 of the second handle portion 320 is adjacent the bottom surface of the control member 313 of the first handle portion 310. Thus, in the open configuration, the gripping portions 312, 322 of the handle portions 310, 320 coextend to form a handle that is sized to be gripped by the human hand to hold the coupling device in the open configuration.

In addition, in the open configuration the aperture 324 of the second handle portion 320 is in alignment with the aperture 314 of the first handle portion 310. The alignment of the apertures 314, 324 permit insertion of a bang stick though the apertures 314, 324, which thereby holds the control members 323, 313 of the handle assembly together and the coupling device 100 in the open configuration permitting release of the gripping portions 312, 322 of the handle assembly. In the open configuration, the housing portions 102, 103 are held open at a thirty degree angle permitting installation onto a power line.

Figure 4:
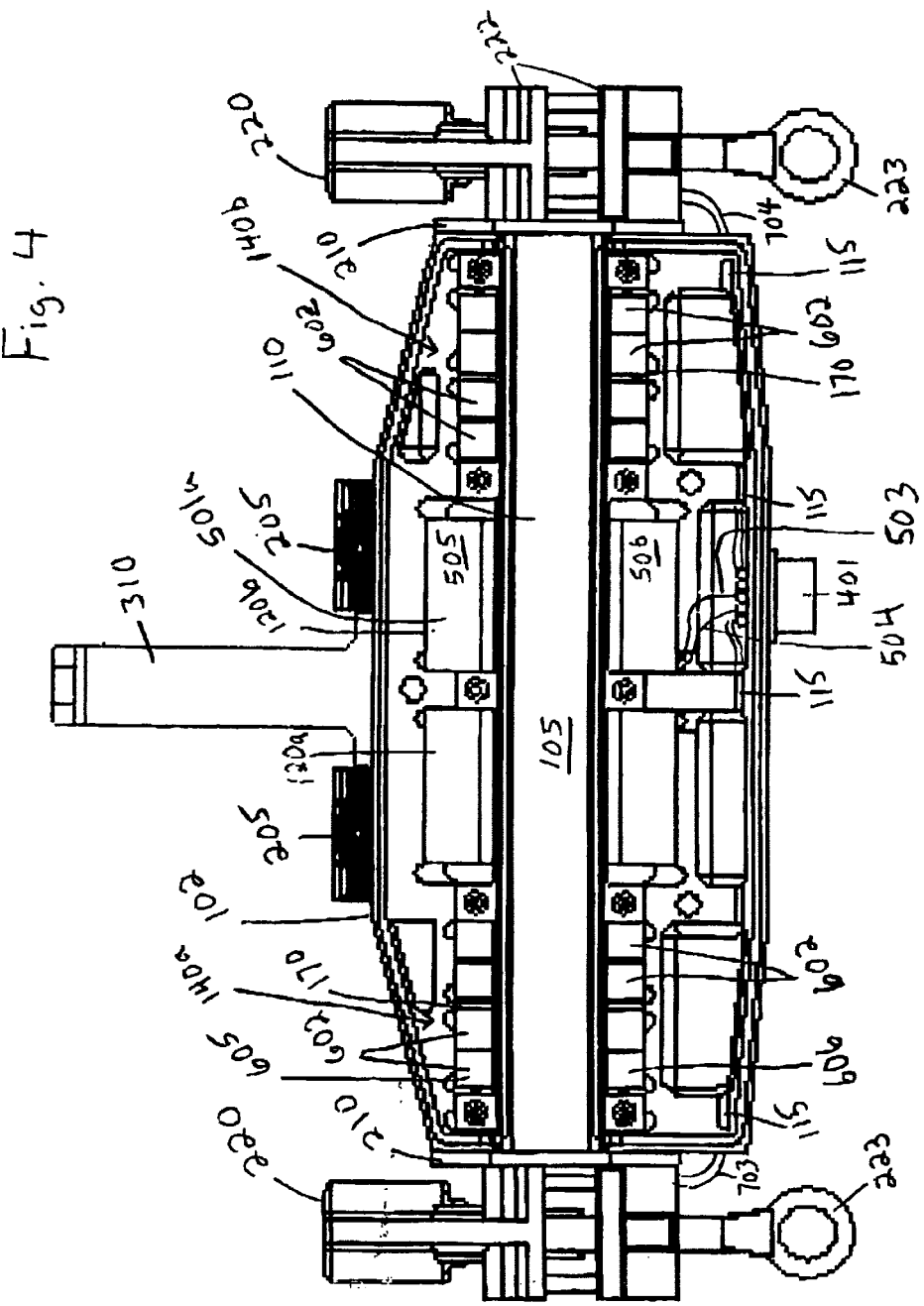
FIG. 4 is a side view illustrating a portion of a housing assembly of an example embodiment of a coupling device according to the present invention.
Figure 5:
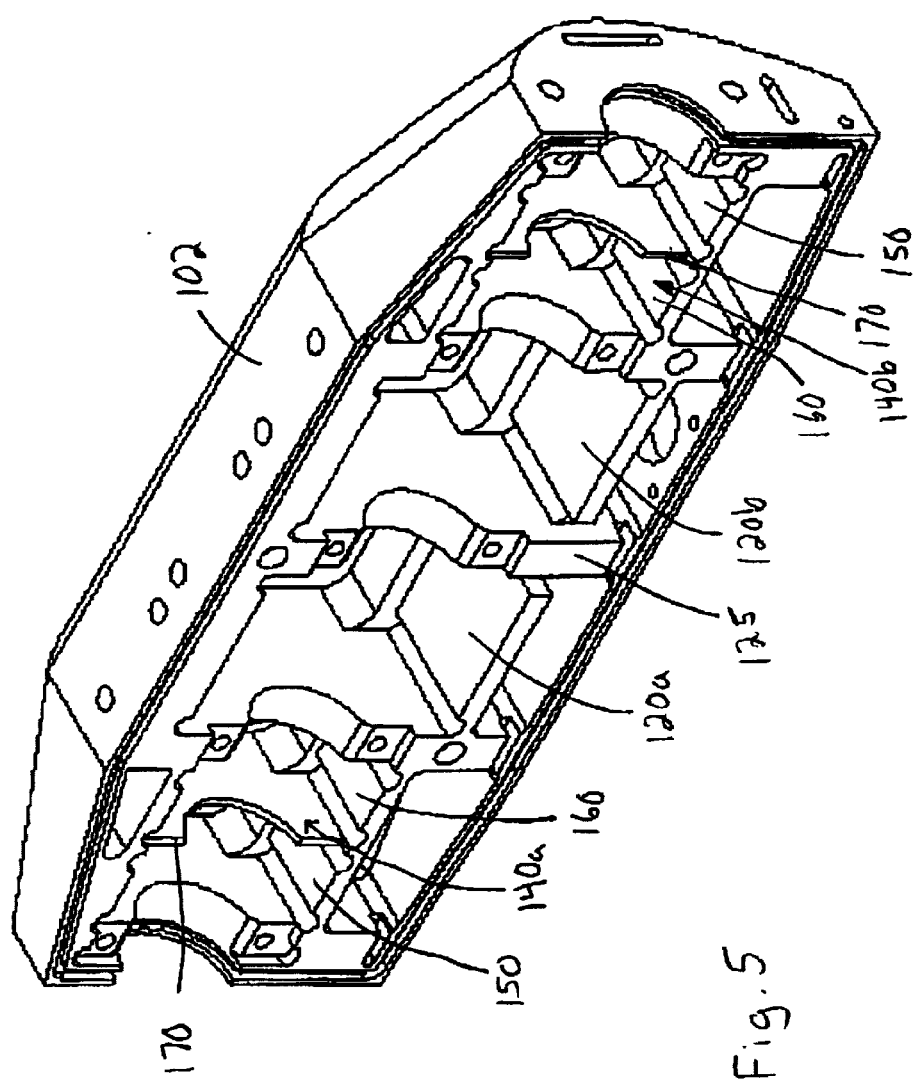
FIG. 5 is a side view illustrating a portion of a housing of an example embodiment of a coupling device according to the present invention.

The coupling device 100 also includes conductors for communicating data signals to and from the power line. Referring to FIG. 4, data signal wire 703 is attached to hot clamp 220 so that when the hot clamp 220 is coupled to the power line, the data signal wire 703 is electrically coupled to the power line. Likewise, data signal wire 704 is attached to the other hot clamp 220 so that when that hot clamp 220 is coupled to the power line, the data signal wire 704 is electrically coupled to the power line. Each data signal wire 703, 704 enters the housing 101 through an aperture on the end of the back housing portion 102. The wires 703, 704 are disposed in grooves 115 in the partitions of the back housing portion 102, which allow the wires 703, 704 to traverse across the partitions that separate various chambers in the back housing portion 102. The wires 703, 704 are coupled to separate connection terminals of the connector 401.

The core 501, which couples to the flux of the power line passing through the power line passage, forms part of a transformer that provides a power signal to the connector 401. The power line through the core 501 acts as a single turn primary. A conductor is wound around the core 501 a plurality of turns to provide a secondary winding. The first and second ends of the secondary winding of the core 501 provide first and second power conductors 503, 504 that are coupled to separate connection terminals of connector 401. Thus, connector 401 provides a pathway for the signals carried by the data wires 703 and 704 and power conductors 503 and 504 into and out of the housing 101.

To install the coupling device 100 on the power line, the user unlocks the twist clamps 130 and grips the first handle portion 310 and second handle portion 320 to urge them together, which transitions the coupling device 100 to the open configuration. Next, the user inserts the bang stick through apertures 314, 324 of the handle assembly 301, which maintains the coupling device 100 in the open configuration when the user releases his or her grip from the handle assembly 301. Next, using the bang stick, the user places the coupling device 100 on the power line with the hinges 205 above the power line so that clamping portions 222 of the hot clamps 220 extend around the power line. The user then removes the bang stick from the handle assembly 301. When the bang stick is removed from the handle assembly 301, the coupling device 100 is supported by the clamping portions 222 of the hot clamps 220, which rest on the power line. In addition, when the bang stick is removed from the handle assembly 301, the first handle portion 310 and second handle portion 320 are no longer held together. Consequently, the weight of the housing portions 102, 103 causes them to pivot downward around the hinges 205 to a partially open configuration. In the partially open configuration, the housing portions 102, 103 are nearly closed and held open by gaskets and/or the core portions 501a, which extend slightly form the inside planar surfaces of the housing portions 102, 103.

Next, the lineman then uses the bang stick to tighten the hot clamps 220 onto the power line. As is known in the art, the hot clamps 220 are tightened onto the power line by rotating the clamp bolt 223. Next, the twist clamps 130 are closed by latching the twist clamp 130 onto the front housing portion 103 and twisting the handle of the twist clamp 130, which is preferably performed with the bang stick by inserting it into an aperture (which may be added after manufacture) in the handle of the twist clamp 130 and turning the handle. As the handle of the twist clamp 130 is twisted, the back housing portion 102 and the front housing portion 103 are forced closer together. As discussed above, urging the back housing portion 102 and the front housing portion 103 together results in the mating faces 505, 506 of the core portions 501a coming into contact with each other. The urging member, in the form of synthetic rubber gasket (or rubber spring) in this example embodiment, behind the core portions 501a resist deformation and therefore, resist closure of the housing once the core portions 501a are in contact with each other. Once the coupling device 100 is in the closed configuration, the core portions 501a of the core are pressed tightly together at their mating surfaces 505, 506 and resist movement.

Figure 12:
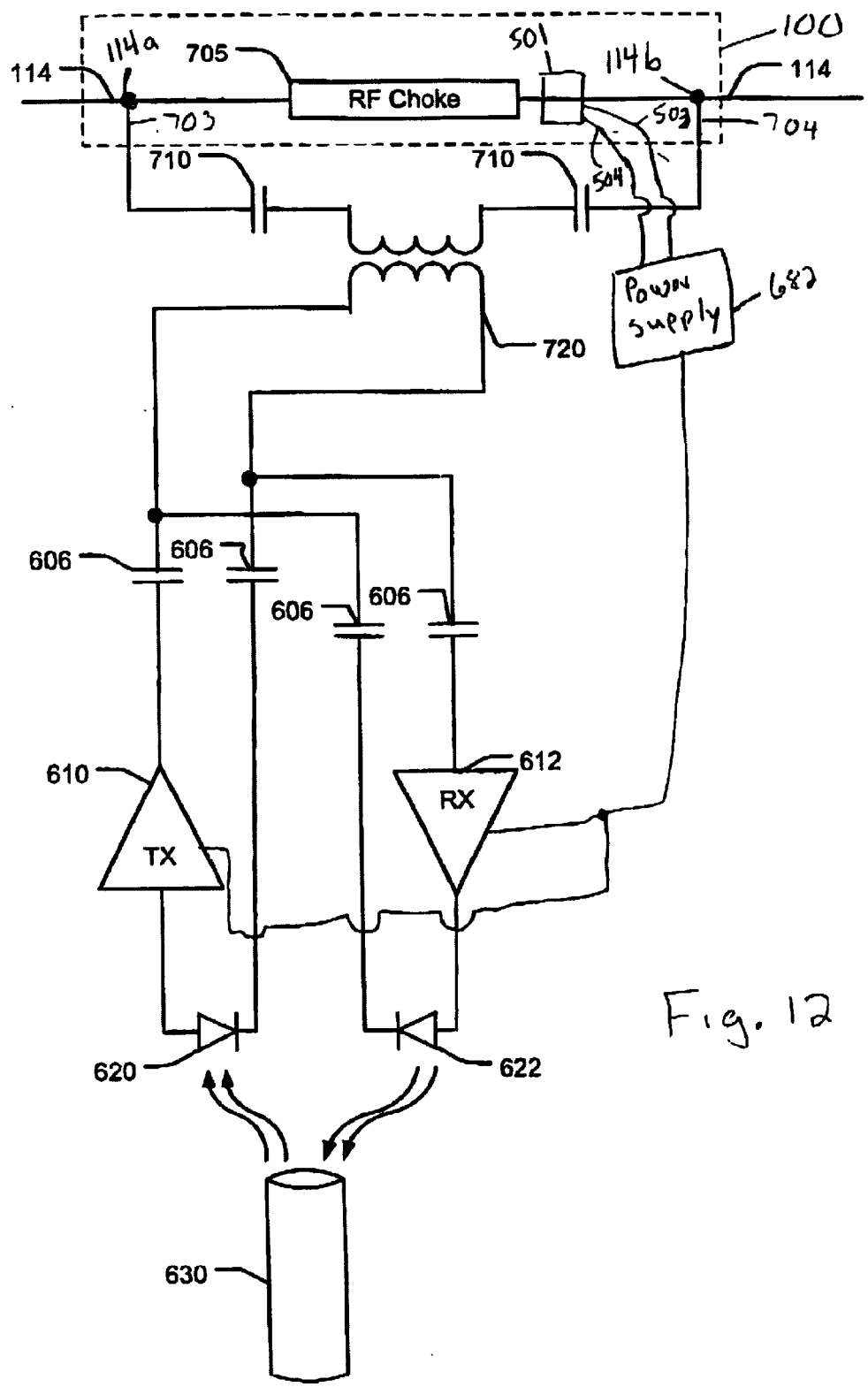
FIG. 12 is a schematical representation of an example embodiment of a coupling device according to the present invention.

Once the coupling device 100 is installed on the power line, a mating connector (not shown) is coupled to the connector 401. As discussed, the connector 401 provides a pathway for data and power transmissions into and out of the coupling device. FIG. 12 is a schematical representation of the power coupling device 100 when coupled onto the power line as well as other portions of an example power line coupler 10. Connection nodes 114a and 114b represent the connection points at which the hot clamps 220 are connected to the power line 114.

As shown in FIG. 12, from an electrical perspective the coupling device 100 includes a radio frequency (RF) filter or RF choke 705 in series with the medium voltage power line 114 and disposed between the connection nodes. The RF choke 705 is an impedance provided by the eight ferrite inductors disposed in the inductor chambers 140. Inductances may range from about 0.1 microHenries to 5.0 microHenries.

The RF choke 705 operates as a low pass filter. In other words, low frequency signals (e.g., a power signal having a frequency of 50 or 60 Hz) pass through the RF choke 705 relatively unimpeded (i.e., RF choke 705 can be modeled as a short circuit to low frequency signals). High frequency signals (e.g., a data signal), however, do not pass through RF choke 705; rather, they are absorbed in RF choke 705 (i.e., RF choke 705 can be modeled as an open circuit to high frequency signals). As such, the voltage across RF choke 705 includes data signals but substantially no power signals. This voltage (i.e., the voltage across RF choke 705) is applied to transformer 720 via capacitors 710 to receive data signals from medium voltage power line 120. To transmit data signals to medium voltage power line 114, a data signal is applied to transformer 720, which in turn communicates the data signal to RF choke 705 through capacitors 710.

The desired inductance of the RF choke 705, and therefore the number, size, permeability, and other characteristics of the ferrite inductors, depends on the characteristics of the power line, the power signal, and the data signal, including, but not limited to, the frequency band of the data signals. This example embodiment is designed to operate on a one and a quarter inch medium voltage power line in which data is transmitted in the thirty to fifty Megahertz range. In this example embodiment the impedance is in the range of four hundred to six hundred ohms over the 30 MHz to 50 MHz range. Other embodiments may include ferrites having different characteristics or may use other methods of conducting data signals to and from the power line, which may or may not be inductive.

Power line coupling device 100 also includes the core 501, which couples to the flux of the power line and provides a source of power to a power supply 682. The voltage provided by the core 501 is dependent on the core characteristics (e.g., permeability, size, and other parameters), the number of windings around the core, the amount of current (or change in current) through the power line, and other factors well known to those skilled in the art.

FIG. 12 also shows other components of the power line coupler 10 including transmit circuitry 610, receive circuitry 612, transmit optoelectronic device 620, and receive optoelectronic device 622.

Capacitors 710 provide some electrical isolation between medium voltage power line 114 and transformer 720. Capacitors 710 further provide filtering of stray power signals. That is, the data signal passes across capacitors 710 while any lower frequency power signals are substantially prevented from passing across capacitors 710. Such filtering can be implemented elsewhere within the system or not implemented at all.

Transformer 720 may operate as a differential transceiver. That is, transformer 720 may operate to repeat data signals received from RF choke 705 to receive circuitry 612 and to repeat data signals received from transmit circuitry 610 to RF choke 705. Transformer 720 also provides some electrical isolation between medium voltage power line 114 and low voltage power line. Transformer 720 also permits RF signals, such as data signals, to pass through and travel on down the power line.

Capacitors 606 are electrically connected between transmit circuitry 610 and receive circuitry 612 and transformer 720. Transmit circuitry 610 and receive circuitry 612 are electrically connected to transmit optoelectronic device 620 and receive optoelectronic device 622, respectively. Transmit optoelectronic device 620 and receive optoelectronic device 622 are in communication with communication medium 630.

In the embodiment illustrated in FIG. 12, the communication medium 630 is a fiber optic cable that provides electrical power isolation between medium voltage power line 114 and low voltage power line. Other communication media may be used to provide such electrical power isolation.

The present invention may be practiced in numerous alternatives to the example embodiment described herein. For example, the connector 401 may be an external connector, a connector on a circuit board attached to, or within, the housing 101. In addition, the data signal wires 703 and 704 may be connected to the connector via a capacitor, or other filtering device. Furthermore, in other embodiments the conductors (data and/or power) may not traverse inside the housing, but may simply extend away from the housing or connection point individually or together in a cable. Similarly, the connection points with the power line, which provide signals to and from data signal wires 703, 704, may be inside the housing in other embodiments.

Figure 13:
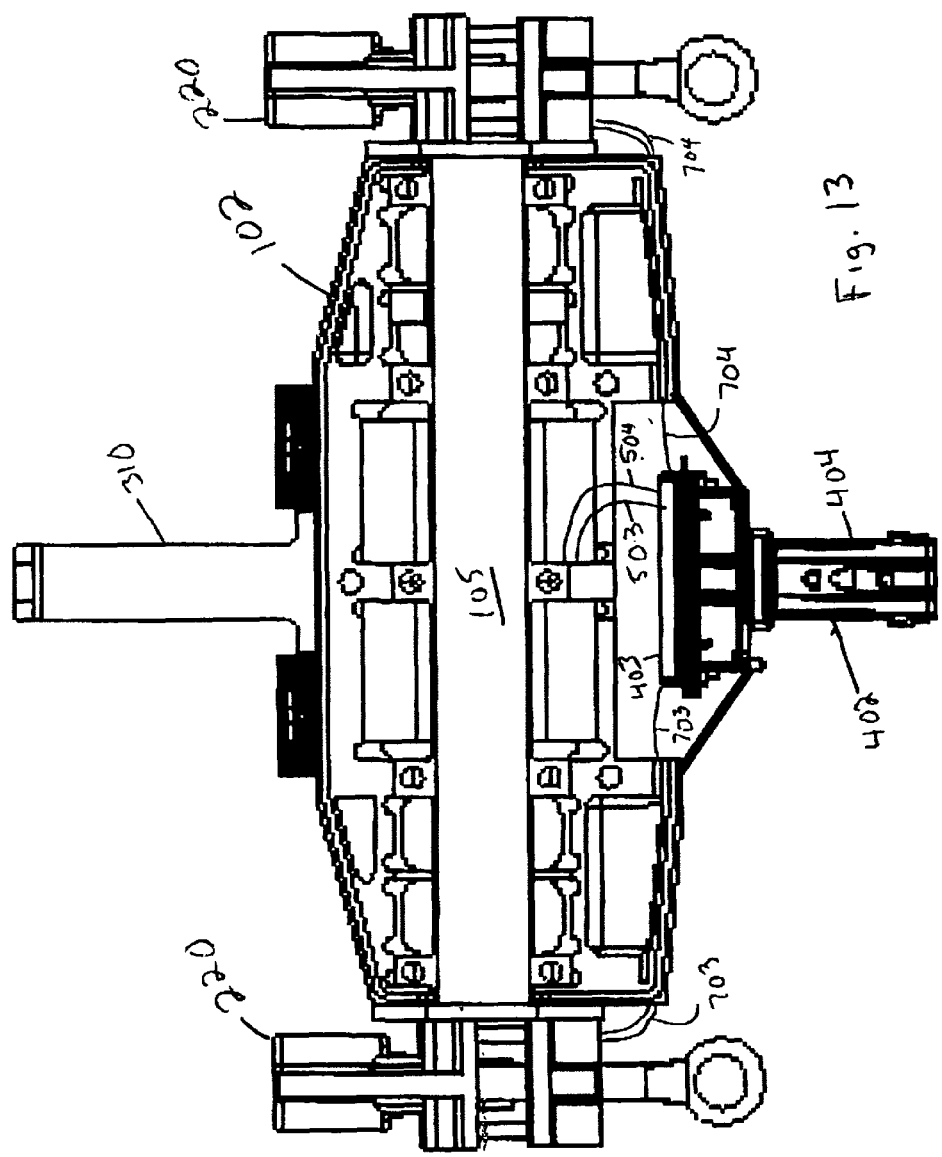
FIG. 13 is a side view illustrating an alternate example embodiment of a coupling device according to the present invention.

FIG. 13 illustrates another embodiment for implementing the present invention. In this embodiment, the connector 402 includes a base portion 403 and a extending portion 404. The extending portion 404 of the connector 402 is a receptacle for receiving a fiber optic cable connector. The base portion 403 is disposed inside the housing 101 and includes a fiber optic transceiver. The fiber optic transceiver receives data signals transmitted over the power line from at least one of the data signal wires 703, 704 and converts the signals to fiber optic signals for transmission to the power line bridge 50 via the fiber optic cable. Likewise, the fiber optic transceiver receives fiber optic signals from the fiber optic cable, converts them to an electrical data signal for transmission over the power line, and transmits the converted data signals through at least one of the data signal wires 703, 704 for transmission of the power line.

The base portion 403 also includes a power supply (such as power supply 682) for receiving power transmissions from the power conductors 503, 504. In other words, the secondary winding of the core 501 is coupled to the power supply, which in turn provides power to the optic transceiver and other circuitry in the connector 402. Thus, in this embodiment, essentially all of the elements shown in FIG. 12 are disposed inside the housing 101 of the coupling device 100. A fiber optic connector 402 described herein is further discussed in U.S. patent application Ser. No. 10/176,501, filed Jun. 21, 2002, and entitled "Fiber Optic Connection System and Method of Using the Same," which is incorporated herein by reference.

FIG. 14 illustrates an alternate handle assembly 301 that can be used as part of the coupling device 100 with slight modifications. The handle assembly 301 includes a first portion 330 mounted to the back housing portion 102 and a second portion 350 mounted to the front housing portion 103. The first portion 330 of the handle assembly 301 includes an extending portion 331 having an aperture 332 therethrough. An adjusting member 335 is pivotally mounted to the first portion 330 of the handle 301 inside the aperture 332 of the extending portion 331. In this embodiment, the adjusting member 335 is tubular in shape with a threaded annular inside surface.

The first portion 330 is mechanically coupled to the second portion 350 with an opening member 370. In this example embodiment of the alternate handle assembly, the opening member 335 includes a threaded portion 372 and an operating member 375 having an aperture sized to receive the end of a bang stick. The opening member 370 also includes a coupling member 374 at its first end 371. The coupling member 374 is rotatably coupled to the threaded portion 372 of the opening member 370 so that the threaded portion is free to rotate. The coupling member 374 is also pivotally coupled to the pivot member 351 of the second portion 350 of the handle assembly 301.

The threaded portion 372 of the opening member 370 extends through the adjusting member 335 and engages the threads on the annular inside surface of the adjusting member 335. The engagement of the threads of the threaded portion 372 with the threads on the annular inside surface of the adjusting member 335 causes the opening member 370 to move longitudinally and relative to the adjusting member 335 (and relative to the extended portion 331 of the first portion 330 of the handle assembly 301) when the operating member 375 of the opening member 370 is rotated. Because the coupling member 374 at the first end 371 of the opening member 370 is pivotally fixed to pivot member 351 of the second portion 350, longitudinal movement of the opening member 370 causes the pivot member 351 to move longitudinally with respect to the extending portion 331 of the first portion 330 of the handle assembly 301 as well. In addition, the pivot member 351 rotates about the hinges 205, which act as a pivot point around which the front housing portion 103 pivots open and closed.

The user rotates the opening member 370 in a first direction to transition the coupling device 100 to the open configuration and rotates the opening member 370 in a second direction to transition the coupling device in the closed configuration.

While the present example embodiment is designed to couple to a medium voltage line, other embodiments of the present invention may be coupled to low voltage or high voltage power lines. Likewise, the overhead power lines with which the above example embodiment is designed to operate have characteristic impedance that is typically in the range of three hundred to five hundred ohms, and extremely low loss. Other embodiments of the present invention may be designed to have differing characteristics (such as a differing inductance) for use with other types of power lines or overhead power lines having differing characteristics.

In another embodiment, the inductor toroids (which are formed by the ferrites) are octagonal-shaped toroids. In this alternate embodiment, the inner radius of the inductor is circular in shape. The outer radius is that of an octagon, which provides a greater surface area to abut against the urging member. Similarly, the core 501 (or cores if more than one is used) may be octagonal-shaped as well. In addition, instead of including a pair of inductors (or ferrites) in the outer chamber 150 and inner chamber 140, a larger ferrite may be constructed so that it is sized fill each chamber. In addition, the larger ferrite may include a groove along its external radial surface (preferably centered between the ends) that mates with a protrusion in the chamber to assist in holding the ferrite in place.

Furthermore, other alternate embodiments may include a single inductor in each chamber 140, which is sized and shaped to provide the desired inductance. Still other embodiments may include a single inductor, which may be a single ferrite toroid. Furthermore, inductors may be formed of other shapes and of materials other than ferrite.

In the above described embodiment, the core 501 is positioned between the connection points, which are at the hot clamps 220, to the power line. Other embodiments may include a core positioned outside the connection points to the power line or omit the core altogether. Likewise, the position of the inductors in other embodiments may be contiguous or have any other suitable position or placement for ease of packaging. To achieve the electrical characteristics of FIG. 13, the coupling device disclosed in the above example includes an inductor between the connection points (the hot clamps 220) to the power line. However, the mechanics of the coupling device may used for other types of coupling means—such as inductive or capacitive—which may provide other electrical characteristics and may or may not include any inductive elements such that the coupling device does not include any inductor (or ferrites) such as in a capacitive coupling device. In other embodiments, such as those providing inductive coupling, the inductor may include one or more windings to couple data signals to and/or from the power line and the fastening members may or may not include conductors coupled thereto.

In addition, the housing and other components of the coupling device are coated and otherwise manufactured for use in outdoor environments. In addition, proper manufacturing tolerances and gaskets may be used to prevent water from entering the housing when in the closed configuration. Specifically, the gasket is disposed along the exterior edge and along the tubing portion of one of the two housing portions.

Finally, the type of data signal coupled by the coupling device may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). Typically, OFDM is used on both the low and medium voltage portions. A modulation producing a wideband signal such as CDMA that is relatively flat in the spectral domain may be used to reduce radiated interference to other systems while still delivering high data communication rates.

It is to be understood that the foregoing illustrative embodiments have been provided merely for the purpose of explanation and are in no way to be construed as limiting of the invention. Words which have been used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for communicatively coupling with a power line, comprising:
    a housing;
    a first fastening member coupled to said housing to attach to the power line;
    a second fastening member coupled to said housing to attach to the power line;
    an inductor disposed between said first fastening member and said second fastening member;
    a first conductor having a first end electrically coupled to said first fastening member; and
    a second conductor having a first end electrically coupled to said second fastening member.

2. The device of claim 1 further comprising:
    a connector coupled to said housing;
    said first conductor having a second end coupled to said connector; and
    said second conductor having a second end coupled to said connector.

3. The device of claim 2, further comprising:
    a transformer having a core coupled to the flux of the power line;
    said transformer having a secondary winding; and
    said secondary winding having a first end coupled to said connector and a second end coupled to said connector.

4. The device of claim 1, further comprising:
    a transformer having a core coupled to the flux of the power line; and
    said transformer having a secondary winding.

5. The device of claim 1, wherein said housing includes an aperture therethrough sized to permit passage of the power line.

6. The device of claim 5, wherein said inductor is not in physical contact with the power line extending through said aperture.

7. The device of claim 4, wherein:
said housing comprises a first housing portion and a second housing portion;
said core comprises a first core portion disposed in said first housing portion and a second core portion disposed in said second housing portion.

8. The device of claim 7, further comprising a first urging member coupled to said first housing portion to urge said first core portion toward said second core portion.

9. The device of claim 1, wherein said inductor acts as an radio frequency choke.

10. The device of claim 1, wherein said housing comprises a first housing portion and a second housing portion; and said inductor comprises a first inductor portion and a second inductor portion, said first inductor portion is disposed in said first housing portion and said second inductor portion is disposed in said second housing portion.

11. The device of claim 10, wherein first housing portion and said second housing portion are coupled together by at least one hinge member.

12. The device of claim 10, further comprising:
a first urging member coupled to said first housing portion to urge said first inductor portion toward said second inductor portion; and
a second urging member coupled to said second housing portion to urge said second inductor portion toward said first inductor portion.

13. The device of claim 12, further comprising:
a transformer having a core coupled to the flux of the power line;
said transformer having a secondary winding;
said core comprising a first core portion disposed in said first housing portion and a second core portion disposed in said second housing portion.

14. The device of claim 13, further comprising:
a third urging member coupled to said first housing portion to urge said first core portion toward said second core portion; and
a fourth urging member coupled to said second housing portion to urge said second core portion toward said first core portion.

15. A device for coupling to a power line, comprising:
a housing having an open configuration and a closed configuration;
a passage disposed in said housing to permit passage of the power line;
an inductor disposed in said housing, said inductor configured to extend substantially around the circumference of the power line extending through said passage;
a transformer disposed in said housing and having a core configured to be coupled to the flux of the power line; and
said transformer comprising a second winding and a first winding, said first winding comprising the power line.

16. The device of claim 15, further comprising:
a connector coupled to said housing; and
said second winding having a first end electrically coupled to said connector and a second end electrically coupled to said connector.

17. The device of claim 16, further comprising:
a first conductor having a first end electrically coupled to the power line and a second end coupled to said connector; and a second conductor having a first end electrically coupled to the power line and a second end coupled to said connector.

18. The device of 15, further comprising:
a first conductor having a first end electrically coupled to the power line at a first connection point;
a second conductor having a first end electrically coupled to the power line at a second connection point; and wherein
said inductor is disposed around the power line between said first connection point and said second connection point.

19. The device of claim 18, further comprising:
a connector coupled to said housing;
said first conductor having a second end coupled to said connector; and
said second conductor having a second end coupled to said connector.

20. The device of claim 15, wherein said inductor is not in physical contact with the power line extending through said passage.

21. The device of claim 15, wherein said passage is not in physical contact with the power line extending through said passage.

22. The device of claim 15, wherein said inductor is substantially toroidal in shape.

23. The device of claim 15, wherein said inductor acts as a radio frequency choke.

24. The device of claim 15, further including:
a first fastening member coupled to said housing to attach to the power line;
a second fastening member coupled to said housing to attach to the power line; wherein
said housing includes a first housing portion and a second housing portion; and wherein
said inductor includes a first inductor portion and a second inductor portion, said first inductor portion disposed in said first housing portion between said first fastening member and said second fastening member, and said second inductor portion is disposed in said second housing portion between said first fastening member and said second fastening member.

25. The device of claim 24, further including:
a first urging member coupled to said first housing portion to urge said first inductor portion toward said second inductor portion; and
a second urging member coupled to said second housing portion to urge said second inductor portion toward said first inductor portion.

26. The device of claim 15, further comprising a third winding in communication with said inductor and configured to communicate data signals via the power line.

27. A device for coupling to a power line, comprising:
a housing;
a passage disposed in said housing to permit passage of the power line;
an inductor disposed in said housing, said inductor configured to extend substantially around the circumference of the power line extending through said passage; and
wherein said housing includes a first housing portion and a second housing portion, said housing having a first end and a second end, said housing having an open configuration and a closed configuration; and further comprising a handle assembly having a first handle portion and a second handle portion.

28. The device of claim 27, wherein:

said first handle portion is attached to said first housing portion and including a first extending member;

said second handle portion is attached to said second housing portion and including a second extending member;

said first extending member and said second extending member are spaced apart when said housing is in said open configuration; and said first extending member is adjacent said second extending member when said housing is in said closed configuration.

29. The device of claim 27, wherein:

said first handle portion is attached to said first housing portion and including a first aperture;

said second handle portion is attached to said second housing portion and including a second aperture;

said first aperture and said second aperture are aligned when said housing is in said open configuration; and said first aperture and said aperture are not aligned when said housing is in said closed configuration.

30. The device of claim 27, wherein:

said first handle portion is attached to said first housing portion, and wherein said first handle portion includes a first threaded portion;

said second handle portion is attached to said second housing portion and includes a second aperture; and further including:

an opening member including a second threaded portion, said opening member being pivotably coupled to said second handle portion, said second threaded portion of said opening member engaging said first threaded portion of said first handle portion wherein rotation of said opening member transitions said housing from said open configuration to said closed configuration.

31. A device for coupling to a power line, comprising:

a housing having a first end and a second end, said housing comprising a first housing portion and a second housing portion pivotally coupled together;

a passage disposed in said housing to permit passage of the power line;

a first fastening member coupled to said first end of said housing to attach to the power line;

a second fastening member coupled to said second end of said housing to attach to the power line;

a first conductor having a first end electrically coupled to said first fastening member; and a second conductor having a first end electrically coupled to said second fastening member.

32. The device of claim 31, wherein:

said housing has an open configuration and a closed configuration;

said first housing portion and said second housing portion each having a first side and a second side;

said first housing portion and said second housing portion being pivotally coupled together at said first sides of said first housing portion and said second housing portion; and further comprising:

a latching member to secure said housing in said closed configuration, said latching member comprising a first latching portion and a second latching portion; wherein said first latching portion is attached to said second side of said first housing portion and said second latching portion is attached to said second side of said second housing portion.

33. The device of claim 31, further comprising:

a handle assembly having a first handle portion and a second handle portion;

said first handle portion being attached to said first housing portion; and said second handle portion being attached to said second housing portion.

34. The device of claim 33, wherein:

said first handle portion includes a first extending member and said second handle portion includes a second extending member;

said first extending member and said second extending member being spaced apart when said housing is in said open configuration; and said first extending member being adjacent said second extending when said housing is in said closed configuration.

35. The device of claim 33, wherein:

said first handle portion includes a first aperture;

said second handle portion includes a second aperture;

said first aperture and said second aperture being aligned when said housing is in said open configuration; and said first aperture and said aperture not being aligned when said housing is in said closed configuration.

36. A device for coupling to a power line, comprising:

a housing comprising a first housing portion and a second housing portion, said first housing portion and said second housing portion being pivotally coupled together;

a passage disposed in said housing to permit passage of the power line; and a first fastening member coupled to said housing to attach to the power line;

a magnetically permeable toroid configured to provide inductance disposed in said housing, said toroid configured to extend substantially around the circumference of the power line extending through said passage;

a transformer disposed in said housing and having a core configured to be coupled to the flux of the power line; and said transformer comprising a first winding and a second winding, said first winding comprising the power line.

37. The device of claim 36, wherein at least a portion of said passage is not in physical contact with the power line extending through said passage.

38. The device of claim 36, wherein first housing portion and said second housing portion are coupled together by at least one hinge member.

39. The device of claim 36, further comprising a third winding disposed through said toroid.

40. The device of claim 39, wherein said third winding is configured to communicate data from the power line.

41. The device of claim 39, wherein said third winding is configured to communicate data to the power line.

42. The device of claim 41, wherein said third winding is configured to communicate data from the power line.

* * * * *

UNITED STATES PATENT AND TRADEMARK OFFICE
CERTIFICATE OF CORRECTION

PATENT NO. : 7,102,478 B2
APPLICATION NO. : 10/176500
DATED : September 5, 2006
INVENTOR(S) : Pridmore, Jr. et al.

It is certified that error appears in the above-identified patent and that said Letters Patent is hereby corrected as shown below:

On the title page, item (56), under "U.S. Patent Documents", in column 2, line 3, delete "al" and insert -- al. --, therefor.

On page 2, item (56), under "U.S. Patent Documents", in column 2, line 62, below "5,796,607 A 8/1998 Le Van Suu ..... 364/140.01" insert -- 5,798,913 8/1998 Tiesinga et al. ... 363/21.13 --.

On page 2, item (56), under "U.S. Patent Documents", in column 2, line 65, below "5,805,053 A 9/1998 Patel et al. ....340/310.01" insert -- 5,805,458 9/1998 McNamara et al. .... 702/60 --.

On page 3, item (56), under "U.S. Patent Documents", in column 1, line 33, below "6,151,480 A 11/2000 Fischer et al. .... 340/310.01" insert -- 6,154,488 11/2000 Hunt.......375/219 --.

On page 3, item (56), under "U.S. Patent Documents", in column 1, line 40, below "6,239,722 B1 5/2001 Colton et al. ......340/870.02" insert -- 6,243,413 6/2001 Beukema .... 375/222 --.

On page 3, item (56), under "U.S. Patent Documents", in column 1, line 67, delete "B1" and insert -- B2 -- , therefor.

On page 4, item (56), under "Foreign Patent Documents", in column 1, line 16, after "A2" insert -- , --.

On page 4, item (56), under "Foreign Patent Documents", in column 1, line 18, after "A2" insert -- , --.

On page 4, item (56), under "Foreign Patent Documents", in column 1, line 23, after "A2" insert -- , --.

On page 4, item (56), under "Foreign Patent Documents", in column 1, line 64, after "A2" insert -- , --.

On page 4, item (56), under "Other Publications", in column 2, line 38, delete "introduction" and insert -- Introduction --, therefor.

On page 5, item (56), under "Other Publications", in column 1, line 2, after "©2002" delete ",".

UNITED STATES PATENT AND TRADEMARK OFFICE
CERTIFICATE OF CORRECTION

PATENT NO. : 7,102,478 B2
APPLICATION NO. : 10/176500
DATED : September 5, 2006
INVENTOR(S) : Pridmore, Jr. et al.

It is certified that error appears in the above-identified patent and that said Letters Patent is hereby corrected as shown below:

On page 5, item (56), under "Other Publications", in column 1, line 36, delete "Rivikin," and insert -- Rivkin, --, therefor.

On page 5, item (56), under "Other Publications", in column 1, line 37, delete "the" and insert -- The --, therefor.

On page 5, item (56), under "Other Publications", in column 1, line 52, delete "No date" and insert the same on line 54 after "2 pages".

On page 5, item (56), under "Other Publications", in column 1, line 54, delete "defautl" and insert -- default --, therefor.

On page 5, item (56), under "Other Publications", in column 1, line 56, delete "No date" and insert the same on line 58, after "1 page".

On page 5, item (56), under "Other Publications", in column 1, line 57, delete "bdld" and insert -- bdld --, therefor.

On page 5, item (56), under "Other Publications", in column 2, line 8, delete "EMETON" and insert -- EMETCON --, therefor.

On page 5, item (56), under "Other Publications", in column 2, line 38, delete "al," and insert -- al., --, therefor.

On page 5, item (56), under "Other Publications", in column 2, lines 40–41, delete "Electornics" and insert -- Electronics --, therefor.

On page 5, item (56), under "Other Publications", in column 2, line 42, delete "Multiton" and insert -- Multitone --, therefor.

On page 5, item (56), under "Other Publications", in column 2, line 51, delete "conenct.htm," and insert -- connect.htm, --, therefor.

On page 6, item (56), under "Other Publications", in column 1, line 2, delete "Systems," and insert -- Systems --, therefor.

In column 6, line 17, delete "103" and insert -- 103. --, therefor.

In column 12, lines 26–27, after "Ser. No. 10/176,501," insert -- now abandoned (Attorney Docket No. CRNT-0069), --.

UNITED STATES PATENT AND TRADEMARK OFFICE
CERTIFICATE OF CORRECTION

PATENT NO. : 7,102,478 B2
APPLICATION NO. : 10/176500
DATED : September 5, 2006
INVENTOR(S) : Pridmore, Jr. et al.

It is certified that error appears in the above-identified patent and that said Letters Patent is hereby corrected as shown below:

In column 14, line 48, in Claim 2, after "claim 1" insert -- , --.

In column 15, line 64, in Claim 17, delete "16," and insert -- claim 16, --, therefor.

In column 16, line 4, in Claim 18, delete "15," and insert -- claim 15, --, therefor.

Signed and Sealed this

Twenty-ninth Day of May, 2007

JON W. DUDAS
*Director of the United States Patent and Trademark Office*